US012729643B2

(12) United States Patent
Sibbach et al.

(10) Patent No.: US 12,729,643 B2
(45) **Date of Patent: *Sep. 8, 2026**

(54) REVERSE FLOW GAS TURBINE ENGINE HAVING ELECTRIC MACHINE

(71) Applicants: General Electric Company, Evendale, OH (US); General Electric Company Polska Sp. z o.o., Warsaw (PL)

(72) Inventors: Arthur William Sibbach, Boxford, MA (US); Adam Tomasz Paziński, Warsaw (PL)

(73) Assignees: General Electric Company, Evendale, OH (US); General Electric Company Polska Sp. z o.o., Warsaw (PL)

(*) Notice: Subject to any disclaimer, the term of this patent is extended or adjusted under 35 U.S.C. 154(b) by 0 days.

This patent is subject to a terminal disclaimer.

(21) Appl. No.: 19/039,205

(22) Filed: Jan. 28, 2025

(65) Prior Publication Data

US 2026/0185479 A1 Jul. 2, 2026

Related U.S. Application Data

(63) Continuation-in-part of application No. 18/307,938, filed on Apr. 27, 2023, now Pat. No. 12,188,414.

(30) Foreign Application Priority Data

Feb. 17, 2023 (PL) ........................................ 443814

(51) Int. Cl.
*F02C 3/14* (2006.01)
*F01D 15/10* (2006.01)
(Continued)

(52) U.S. Cl.
CPC .............. *F02C 3/145* (2013.01); *F01D 15/10* (2013.01); *F02C 6/206* (2013.01); *F02C 7/047* (2013.01);
(Continued)

(58) Field of Classification Search
CPC ........... F05D 2220/76; F05D 2220/323; F05D 2220/32; F05D 2260/213; F05D 2260/232;
(Continued)

(56) References Cited

U.S. PATENT DOCUMENTS 5,265,408 A * 11/1993 Sheoran ................. B64D 33/08 60/262
7,372,175 B2 5/2008 Bouiller et al.
(Continued)

FOREIGN PATENT DOCUMENTS

EP 2708701 A2 * 3/2014 ............. F01D 15/10
EP 3597885 A1 * 1/2020 ............. F01D 15/12
(Continued)

OTHER PUBLICATIONS

European Patent Office, "Extended European Search Report," issued in connection with European Patent Application No. 24151475.1, dated Jun. 14, 2024, 7 pages.

*Primary Examiner* — Craig Kim
(74) *Attorney, Agent, or Firm* — Hanley, Flight & Zimmerman, LLC

(57) ABSTRACT

An aircraft engine assembly includes a gas turbine engine having an intake channel configured to receive an incoming flow of air and form an intake flow of air, the intake channel configured to turn the received incoming flow of air from an incoming flow direction to a first axial direction of the gas turbine engine, the incoming flow direction reverse of the first axial direction, and an electric machine coupled with the low pressure shaft and located at the aft end of the gas turbine engine proximate the intake channel, the electric machine in heat exchange communication with the intake
(Continued)

flow of air such that the electric machine transfers heat to the incoming flow of air within the intake channel when the electric machine is operated.

7 Claims, 26 Drawing Sheets

(51) Int. Cl.
*F02C 6/20* (2006.01)
*F02C 7/047* (2006.01)
*F02C 7/052* (2006.01)
*F02C 7/055* (2006.01)

(52) U.S. Cl.
CPC .............. *F02C 7/052* (2013.01); *F02C 7/055* (2013.01); *F05D 2220/323* (2013.01); *F05D 2240/12* (2013.01); *F05D 2260/20* (2013.01)

(58) Field of Classification Search
CPC ...... F05D 2260/20; F01D 15/10; F02C 3/145; F02C 7/12; F02C 7/18; F02C 7/32; F02K 1/04; F02K 3/06
See application file for complete search history.

(56) References Cited

U.S. PATENT DOCUMENTS 8,176,725 B2 * 5/2012 Norris .................... F02K 3/105 60/761
8,278,774 B2 * 10/2012 Macchia .............. H02K 7/1823 60/773
9,097,134 B2 8/2015 Ferch et al.
9,169,780 B2 10/2015 Barnett et al.
9,239,029 B2 * 1/2016 Herrmann .............. F02K 1/827
9,915,164 B2 3/2018 Roberge
10,077,041 B1 * 9/2018 Wicks .................. F02P 5/1504
10,308,366 B2 6/2019 Kupiszewski et al.
10,458,340 B2 10/2019 Lefebvre
10,550,764 B2 * 2/2020 Roberge .................... F02C 3/10
11,162,379 B2 11/2021 Spierling
11,242,156 B2 2/2022 Spierling
11,371,430 B2 6/2022 Lents et al.
2013/0091850 A1 4/2013 Francisco
2013/0145769 A1 * 6/2013 Norris ...................... F02C 7/32 60/722
2013/0183136 A1 * 7/2013 Roberge .................. F01D 19/00 415/208.1
2013/0255224 A1 * 10/2013 Kupratis .................. F02C 9/18 60/39.15
2014/0079530 A1 * 3/2014 Ferch ...................... F01D 15/10 415/1
2016/0290226 A1 * 10/2016 Roberge .................... F02C 7/32
2018/0003071 A1 1/2018 Lents et al.
2018/0003072 A1 1/2018 Lents et al.
2018/0003109 A1 1/2018 Lents et al.
2018/0023470 A1 * 1/2018 Lefebvre ................ F02C 6/206 60/226.1
2018/0073438 A1 * 3/2018 Durocher .................. F02C 7/32
2019/0063324 A1 * 2/2019 Gould ..................... F02C 7/185
2019/0316486 A1 * 10/2019 Roberge .................... F02C 7/18
2020/0017225 A1 1/2020 Chung et al.
2020/0080476 A1 * 3/2020 Plante ....................... F02C 7/36
2020/0173300 A1 * 6/2020 Gemin ................... B64D 27/10
2020/0291810 A1 * 9/2020 Spierling .................. F02C 7/12
2021/0231058 A1 * 7/2021 Plante ....................... F02C 7/36
2021/0239046 A1 * 8/2021 Muldoon .................. F02C 7/18
2021/0262386 A1 * 8/2021 Kalevi Makela ..... F01D 25/162
2021/0324799 A1 * 10/2021 Suzuki ................... B64D 33/08
2021/0355869 A1 11/2021 Lefebvre
2021/0388732 A1 12/2021 Turcotte
2022/0045573 A1 * 2/2022 Seki .......................... F02C 7/18
2022/0090507 A1 * 3/2022 Erdmenger ......... F04D 27/0238
2022/0307418 A1 * 9/2022 Vitt ......................... F02C 7/141
2022/0403782 A1 * 12/2022 Menheere ............. F04D 19/002
2023/0243310 A1 * 8/2023 Plante ....................... F02C 7/36 60/226.1
2024/0254894 A1 * 8/2024 Mallampati ............. F02C 7/057
2025/0197013 A1 * 6/2025 Sobanski ................ F02C 3/145
2025/0243805 A1 * 7/2025 Niergarth .................. F02C 6/06

FOREIGN PATENT DOCUMENTS

EP 3792465 A1 3/2021
EP 3808430 B1 * 8/2023 ............. F01D 25/32
EP 4435235 A1 * 9/2024 ............. F01D 25/02
EP 4570650 A2 * 6/2025 ............. F02C 7/047
FR 2981406 A1 4/2013
GB 2610568 A * 3/2023 ............... F02K 5/00

* cited by examiner 1100
1102
1106
1102
1102
1102
1104
1106
1102
1110
1104
1106
1102
1110
1110
1104
106
1102
1110
1108
1102

1122
1120
1106
1110

1100
1104
1102
1102
1102
1106
1110
1108
1102

1200
1200
1200

1100
1104
1104
1104
1102
1102
1102
1104

REVERSE FLOW GAS TURBINE ENGINE HAVING ELECTRIC MACHINE

PRIORITY INFORMATION

The present application claims priority to U.S. patent application Ser. No. 18/307,938, filed on Apr. 27, 2023, which claims priority to Polish Patent Application Number P.443814, filed on Feb. 17, 2023. U.S. patent application Ser. No. 18/307,938 and Polish Patent Application Number P.443814 are hereby incorporated by reference in their entirety for all purposes.

FIELD

The present disclosure relates generally to a reverse flow gas turbine engine having an electric machine.

BACKGROUND

A gas turbine engine generally includes a turbomachine and a rotor assembly. Gas turbine engines, such as turboprop engines, may be used for aircraft propulsion. In the case of a turboprop engine, the rotor assembly may be configured as a variable pitch propeller. In some installations the gas turbine engine is oriented in a reverse flow configuration such that an air flow provided by forward motion of an aircraft is received by the gas turbine engine and turned to flow in a reverse direction through the turbomachinery of the gas turbine engine before an exhaust is discharged from the engine. Locating auxiliary components in such a reverse flow configuration remains an area of interest.

BRIEF DESCRIPTION OF THE DRAWINGS

A full and enabling disclosure of the presently described technology, including the best mode thereof, directed to one of ordinary skill in the art, is set forth in the specification, which makes reference to the appended figures, in which.

DETAILED DESCRIPTION

Figure 1:
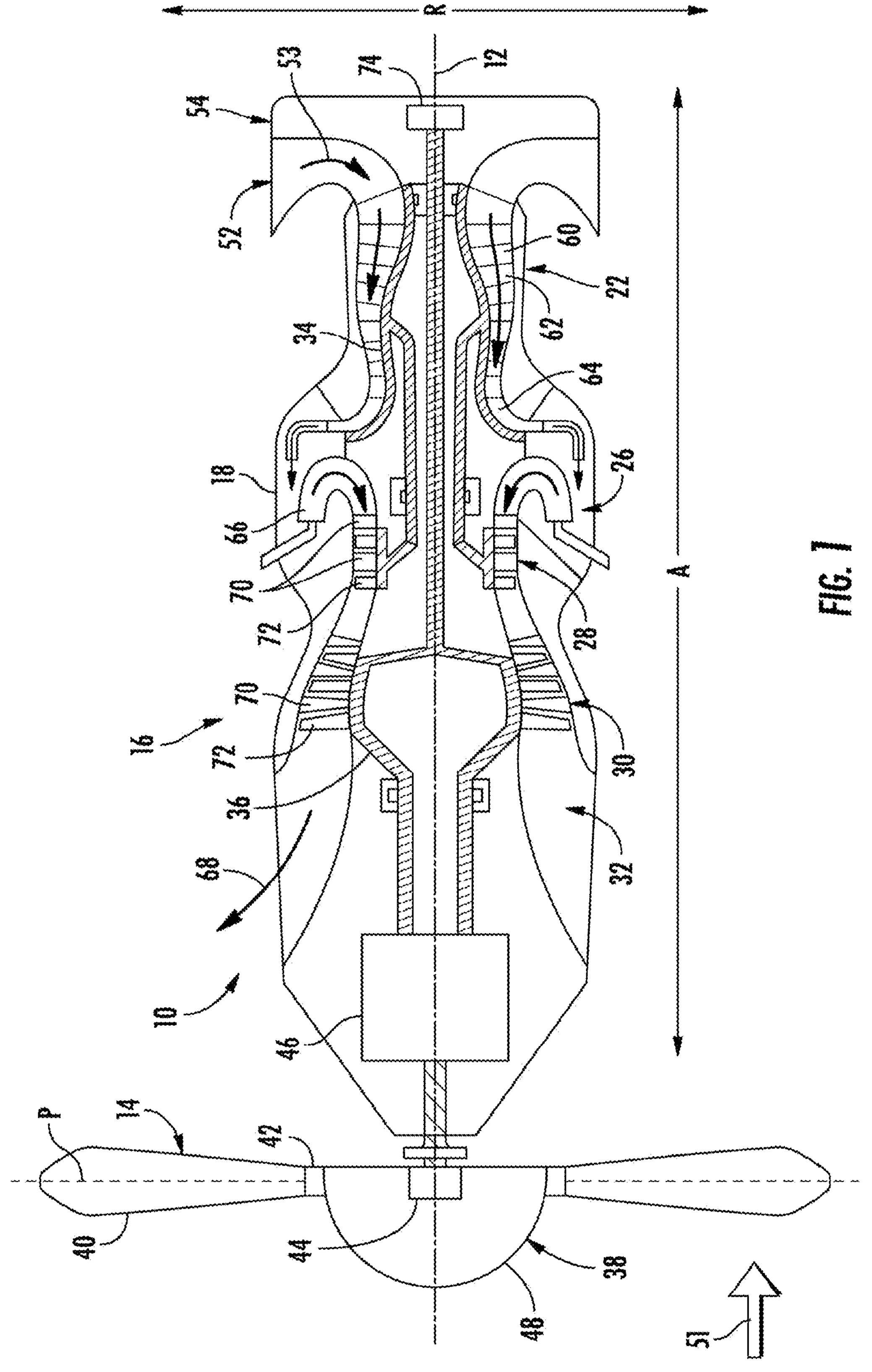
FIG. 1 is a cross-sectional view of a gas turbine engine in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word “exemplary” is used herein to mean “serving as an example, instance, or illustration.” Any implementation described herein as “exemplary” is not necessarily to be construed as preferred or advantageous over other implementations. Additionally, unless specifically identified otherwise, all embodiments described herein should be considered exemplary.

The singular forms “a”, “an”, and “the” include plural references unless the context clearly dictates otherwise.

The term “at least one of” in the context of, e.g., “at least one of A, B, and C” refers to only A, only B, only C, or any combination of A, B, and C.

The term “turbomachine” refers to a machine including one or more compressors, a heat generating section (e.g., a combustion section), and one or more turbines that together generate a torque output.

The term “gas turbine engine” refers to an engine having a turbomachine as all or a portion of its power source.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., -er, where applicable), when used with a compressor, a turbine, a shaft, or spool components, etc. each refer to relative pressure within an engine unless otherwise specified. For example, a "low turbine" or "low pressure turbine" defines a component configured to operate at a pressure lower than a "high pressure turbine" of the engine.

The terms "forward" and "aft" refer to relative positions within a gas turbine engine or vehicle, and refer to the normal operational attitude of a vehicle such as an aircraft. For example, with regard to an aircraft, forward refers to a position closer to a nose of the aircraft and aft refers to a position closer to an empennage of the aircraft.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the terms "axial" and "axially" refer to directions and orientations that extend substantially parallel to a centerline of the gas turbine engine. Moreover, the terms "radial" and "radially" refer to directions and orientations that extend substantially perpendicular to the centerline of the gas turbine engine. In addition, as used herein, the terms "circumferential" and "circumferentially" refer to directions and orientations that extend arcuately about the centerline of the gas turbine engine. A "third stream" as used herein means a non-primary air stream capable of increasing fluid energy to produce a minority of total propulsion system thrust. The third stream may generally receive inlet air (air from a ducted passage downstream of a primary fan) instead of freestream air (as the primary fan would). A pressure ratio of the third stream may be higher than that of the primary propulsion stream (e.g., a bypass or propeller driven propulsion stream). The thrust may be produced through a dedicated nozzle or through mixing of an airflow through the third stream with a primary propulsion stream or a core air stream, e.g., into a common nozzle.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

As used herein, the terms "system," "unit," "module,", "engine,", "component," etc., may include a hardware and/or software system that operates to perform one or more functions. For example, a module, unit, or system may include a computer processor, controller, and/or other logic-based device that performs operations based on instructions stored on a tangible and non-transitory computer readable storage medium, such as a computer memory. Alternatively, a module, unit, or system may include a hard-wires device that performs operations based on hard-wired logic of the device. Various modules, units, engines, and/or systems shown in the attached figures may represent the hardware that operates based on software or hardwired instructions, the software that directs hardware to perform the operations, or a combination thereof.

As will be discussed in more detail below, the subject matter of the present disclosure is directed generally to locating an electric machine near an intake channel of a reverse flow turboprop engine at a location which is closer to an aft end of the turboprop engine than to a forward end of the turboprop engine. The electric machine is rotatingly coupled to a low pressure shaft of the reverse flow turboprop engine and as a consequence of the reverse flow configuration the low pressure shaft extends aft of a core of the turboprop engine. The electric machine can be operated as a generator and/or motor for use in either adding power to and/or extracting power from the low pressure shaft. Placement of the electric machine in the proximate location described above permits an exchange of heat between the electric machine and a flow of air traversing through an intake channel of the engine. Such exchange of heat can provide tighter packaging of the electric machine and/or higher heat generating operating demands placed upon the electric machine.

To accommodate the placement of the electric machine in an aft location in at least one embodiment, an intake channel may be provided that forms a non-annular flow path at an inlet to the intake channel which then changes to an annular flow path around the LP shaft prior to air being delivered to a compressor of the gas turbine engine.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a reverse flow turboprop engine 10, referred to herein as "turboprop engine 10." As shown in FIG. 1, turboprop engine 10 defines an axial direction A (extending parallel to a longitudinal centerline or central axis 12 provided for reference), a radial direction R, and a circumferential direction C (not shown) disposed about the axial direction A. Turboprop engine 10 generally includes a propeller section 14 and a core turbine engine 16 disposed aft of the propeller section 14 from an aircraft perspective, the propeller section 14 being operable with, and driven by, core turbine engine 16.

The exemplary core turbine engine 16 depicted generally includes a substantially tubular outer casing 18 extending generally along axial direction A. Outer casing 18 generally encloses core turbine engine 16 and may be formed from a single casing or multiple casings. Core turbine engine 16 includes, in a serial flow relationship, a compressor 22, a combustion section 26, a high pressure (HP) turbine 28, a low pressure (LP) turbine 30, and an exhaust section 32. An air flow path generally extends through compressor 22, combustion section 26, HP turbine 28, LP turbine 30, and exhaust section 32 which are in fluid communication with each other.

An HP shaft or spool 34 drivingly connects the HP turbine 28 to the compressor 22. An LP shaft or spool 36 drivingly connects the LP turbine 30 to propeller section 14 of the turboprop engine 10. For the embodiment depicted, propeller section 14 includes a variable pitch propeller 38 having a plurality of propeller blades 40 coupled to a disk 42 in a spaced apart manner. As depicted, the propeller blades 40 extend outwardly from disk 42 generally along the radial direction R. Each propeller blade 40 is rotatable relative to the disk 42 about a pitch axis P by virtue of the propeller blades 40 being operatively coupled to a suitable actuation member 44 configured to collectively vary the pitch of the propeller blades 40 in unison. The propeller blades 40, disk 42, and actuation member 44 are together rotatable about the longitudinal centerline 12 by LP shaft 36 across a power gear box 46. The power gear box 46 includes a plurality of gears for stepping down the rotational speed of the LP shaft 36 to a more efficient rotational fan speed and is attached to one or both of a core frame or a fan frame through one or more coupling systems. Disk 42 is covered by a rotatable front hub 48 aerodynamically contoured to promote an airflow through the plurality of propeller blades 40.

During operation of the turboprop engine 10, a volume of air 50 (also referred to as a free stream flow of air 51 prior to its encounter with the propeller 38, and referred to as an incoming flow of air 50 after passage through the propeller 38) passes through blades 40 of propeller 38 and is urged toward a radial inlet 52 of core turbine engine 16. More specifically, turboprop engine 10 includes an intake channel 54 that defines radial inlet 52 that routes an inlet portion of air 53 of the flow of air 50 from inlet 52 downstream to compressor 22. Though the inlet 52 is depicted as a radial inlet in the embodiment of FIG. 1, other configurations of inlet 52 are also contemplated. For example, the inlet 52 can also take the form of an inlet arranged in an axial direction to capture the inlet portion of air 53 of the volume of air 50. The inlet portion of air 53 of the flow of air 50 captured by the inlet 52 is referred to herein as an intake flow of air. The intake channel 54 defines the intake flow of air and generally extends from an inlet of the intake channel 54 to just upstream of the compressor 22.

The turboprop engine 10 embodiments described herein are configured as reverse flow engines. Such engines are characterized by a general relationship between the direction of the flow of incoming air 50 (such direction can be used to characterize the relative motion of air during a mode of operation of the engine 10 such as a forward thrust mode) and that of the flow of air axially through the turboprop engine 10. The flow of air through the core turbine engine 16 is generally reverse to that of the flow of incoming air 50. Turning the flow from the direction of the incoming flow of air 50 to the axial direction through the core turbine engine 16 is usually performed by the intake channel 54. The change of direction is reversed in that the bulk direction of the flow of air 50 (itself having a circumferential swirl component imparted by the propeller blades 40 in addition to a longitudinal component) is opposite, or reverse, to the bulk direction of air flow axially through the core turbine engine 16 (which itself also includes a longitudinal component but also include radial and circumferential components owing to the shape of the flow path and swirl induced by rotating turbomachinery components) during one or more phases of operation of the core turbine engine 16. Thus, it will also be appreciated that the term “reverse” is a relative comparison of the longitudinal components of the bulk flow of air 50 and bulk flow of air axially within the engine 10. Though the longitudinal direction of the flow of air 50 may not be perfectly parallel with the axial flow of air through the engine 10, it will be appreciated that the longitudinal components of the directions the flow of air 50 and the axial flow are reversed.

Compressor 22 includes one or more sequential stages of compressor stator vanes 60, one or more sequential stages of compressor rotor blades 62, and an impeller 64. Though the illustrated embodiment includes both axial and centrifugal flow compressors, in some forms the turboprop engine 10 can include just an axial flow compressor(s) or centrifugal flow compressor(s). The one or more sequential stages of compressor stator vanes 60 are coupled to the outer casing 18 and compressor rotor blades 62 are coupled to HP shaft 34 to progressively compress the air 53. Impeller 64 further compresses air 53 and directs the compressed air 53 into combustion section 26 where air 53 mixes with fuel. Combustion section 26 includes a combustor 66 which combusts the air/fuel mixture to provide combustion gases 68.

Combustion gases 68 flow through HP turbine 28 which includes one or more sequential stages of turbine stator vanes 70 and one or more sequential stages of turbine blades 72. The one or more sequential stages of turbine stator vanes 70 are coupled to the outer casing 18 and turbine blades 72 are coupled to HP shaft 34 extract thermal and/or kinetic energy therefrom. Combustion gases 68 subsequently flow through LP turbine 30, where an additional amount of energy is extracted through additional stages of turbine stator vanes 70 and turbine blades 72 coupled to LP shaft 36. The energy extraction from HP turbine 28 supports operation of compressor 22 through HP shaft 34 and the energy extraction from LP turbine 30 supports operation of propeller section 14 through LP shaft 36. Combustion gases 68 exit turboprop engine 10 through exhaust section 32.

It will be understood that one or more rows of stator vanes 60 and 70 can be variable vanes controlled by a controller (see below with respect to controller 100) in one form. Furthermore, with particular respect to stator vanes 70, one or more rows of the stator vanes 70 can be variable.

In other exemplary embodiments, the turbine engine may include any suitable number of compressors, turbines, shafts, etc. For example, as will be appreciated, HP shaft 34 and LP shaft 36 may further be coupled to any suitable device for any suitable purpose. For example, in certain exemplary embodiments, turboprop engine 10 of FIG. 1 may be utilized in aeroderivative applications. Additionally, in other exemplary embodiments, turboprop engine 10 may include any other suitable type of combustor, and may not include the exemplary reverse flow combustor depicted.

The embodiment of turboprop engine 10 illustrated in FIG. 1 includes an electric machine 74 located aft of the core turbine engine 16 and rotatingly coupled to the LP shaft 36. In some forms the electric machine 74 is contained in an environmentally sealed housing which can be pressurized to minimize electrical corona and discharge effects. Further, in some forms the LP shaft 36 and electric machine 74 can be configured to rotate at a constant speed from idle to max power, with thrust of the engine 10 controlled by the variable pitch propeller 38.

Given the coaxial relationship of the LP shaft 36 with the HP shaft 34, in such an embodiment the LP shaft 36 is configured to extend aft of the core turbine engine 16, and also further aft than the HP shaft 34, despite the HP compressor 22 being the upstream-most compressor of the turboprop engine 10 (i.e., despite there being no low-pressure compressor upstream of the HP compressor 22 and downstream of the inlet 52).

The electric machine 74 can be used in many different power configurations. In one form the electric machine is configured to extract power from the LP shaft 36 when the machine 74 operates as a generator. The extraction of mechanical power from the LP shaft 36 and conversion to electric power can be used to charge an on-board power storage device such as a battery, or alternatively to provide power to another electrical device (e.g., an electric motor, an electrical accessory on an aircraft, etc.). In other forms, the electric machine 74 can be used as a motor to provide power to the LP shaft 36 to supplement power extracted by the LP turbine 30 from the combustion gases 68. In these forms, the electric machine 74 can be configured to provide a minimum of 10% of supplemental thrust to the engine 10, a minimum of 20% of supplemental thrust to the engine 10, and up to 40% of supplemental thrust to the engine 10 in various embodiments. In still other forms, the electric machine 74 can be configured to power to drive 100% of thrust from the propeller section 14. A scenario in which the electric machine 74 provides all power to the propeller section 14 can include shutdown of the engine 10. In one non-limiting example of an engine being shut down, upon or near landing the engine 10 can be commanded to shut down and the electric machine 74 used to drive further propeller thrust requirements, whether that includes fine power on short-final or power when the propeller section 14 is configured in reverse pitch to aid in slowing the aircraft.

A battery or other secondary power source can be used to provide power to the electric machine 74 when operated as a motor. The supplementation of power by the electric machine 74 to the LP shaft 36 in this manner can be transitory or steady state, depending on the control requirements requested of the turboprop engine. For example, in those operating conditions in which power output of the engine lags behind a commanded power, the electric machine 74 can provide near instantaneous supplemental power to the LP shaft 36 to provide on-condition power output from the turboprop until the engine 10 achieves a steady state operating condition at the higher output power. In still further forms, the electric machine can be operated as a motor in some portions of operation of the engine 10, and as a generator in other portions of operation of the engine 10, along the lines of any of the variations discussed herein.

Given the proximity of the electric machine 74 to the intake channel 54, the electric machine 74 can be further positioned to exchange heat with the inlet portion of the air 53 traversing the intake channel 54 to aid in removing heat from the electric machine 74. Cooling of the electric machine 74 using the inlet portion of air 53 permits tighter packaging of the electric machine 74 and closer location of the electric machine 74 to heat generating portions of the engine 10. The relative location of the electric machine 74 and intake channel 54 can permit an effective exchange of heat through any number of useful mechanisms including at least one of conduction and convection cooling. In some forms cooling air may directly impinge upon the electric machine 74 and/or may be used to vent a cavity in which the electric machine 74 is located. In still further forms the electric machine 74 can be used in part to form the flow path of the intake channel 54 to provide direct heat transfer between the electric machine 74 and the inlet portion of air 53. In yet still further forms the electric machine 74 may be in direct contact with a portion of the intake channel 54 forming the flow path such that heat transfer occurs between the electric machine 74 and inlet portion of air 53 via that particular portion of the intake channel 54 forming the flow path. Further aspects of the location of electric machine 74 and various cooling techniques are described further below.

Various other embodiments are disclosed further herein related to the location and use of the electric machine 74, the shape and configuration of the intake channel 54, and various techniques to exchange heat between the electric machine 74 and the inlet portion of air 53 flowing in the intake channel 54. As will be appreciated, like reference numerals refer to like elements and, thus, any of the variations disclosed herein related to any particular exemplary embodiment in any given figure are also applicable to embodiments depicted and discussed with respect to the other figures.

Figure 2:
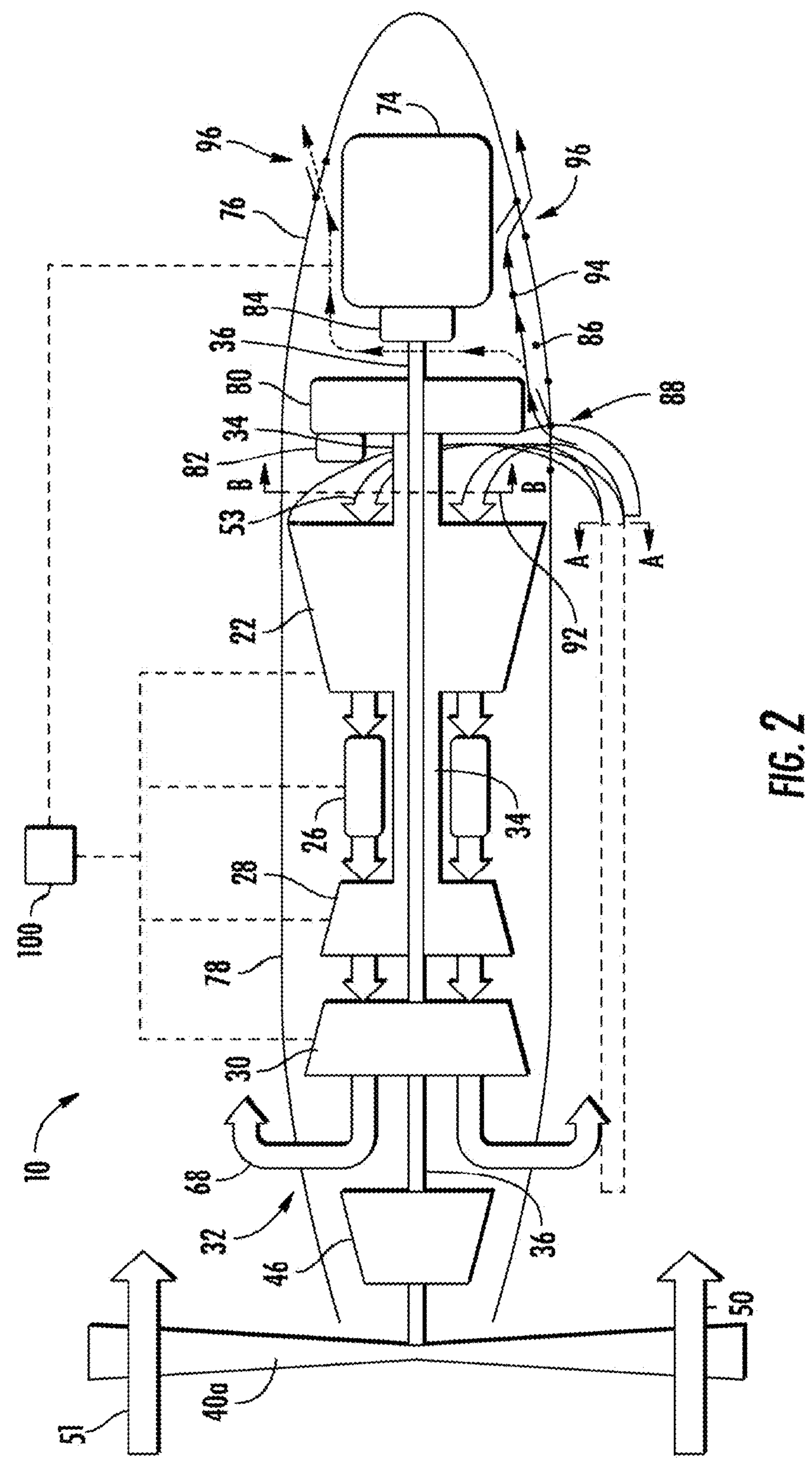
FIG. 2 is a schematic view of a gas turbine engine with an electric machine in accordance with the present disclosure.

Turning now to FIG. 2, an exemplary embodiment of the turboprop engine 10 is illustrated in which the engine 10 includes an electric machine 74 located aft of the core turbine engine 16 in a tail cone 76 defining an aft end of an engine nacelle 78. As will be appreciated, the engine nacelle 78 is used to enclose the gas turbine engine and includes one or more portions that interface with aircraft structure such as a wing, pylon, fuselage, etc. The tail cone 76 may be a complete body of revolution that circumferentially encloses the electric machine 74 in some embodiments. In alternative embodiments, however, the tail cone 76 may be a partial body of revolution or other shape that covers the electric machine to complete an enclosure with other aircraft structure (e.g., wing, pylon, fuselage, etc.). Thus, the tail cone 76 is any suitable structure of the engine nacelle which is located aft of the core turbine engine 16 and is used to wholly or partially enclose the electric machine 74.

In some forms of the embodiments disclosed herein the engine nacelle 78 may take on the form of an engine cowling when the engine 10 is installed on a single engine turboprop aircraft. In such installations the electric machine 74 can be located between the core turbine engine 16 and a firewall of the aircraft. In such installations, therefore, the engine cowling or other forebody structure of the aircraft can be used to enclose the electric machine 74.

The embodiment of FIG. 2 includes an accessory gear box (AGB) 80 located aft of the HP compressor 22 and is coupled to a starter motor 82. The starter motor 82 is coupled to the HP shaft via the AGB 80 such that during a start sequence of the turboprop engine 10 the starter motor 82 can be used to impart rotational power via the AGB 80 to the HP shaft 34. In the illustrated embodiment, the AGB 80 is depicted as being co-axial with the HP shaft 34 and LP shaft 36 (it will be appreciated that although the AGB 80 is rotatingly coupled to the HIP shaft 34, it is not otherwise rotatingly coupled with the LP shaft 36). To provide such a coaxial relationship between the HP shaft 34 and AGB 80, in one form the AGB 80 is a planetary gear system in which the HP shaft 34 is coupled to a sun gear of the planetary gear system. In other forms a central gear of the AGB 80 is coupled via one or more idler gears to the starter motor 82. Other forms are also contemplated to permit a co-axial relationship between the AGB 80 and HP shaft 34. In other forms, however, the AGB 80 need not be co-axial with the HP shaft 34.

The electric machine 74 is also depicted in FIG. 2 as being coupled to the LP shaft 36 through a speed change device 84 which can be used to alter a speed ratio between the LP shaft 36 and the electric machine 74. In some forms, the speed change device 84 can be a transmission that provides a fixed speed ratio, but in other forms the transmission can provide variable speed ratios. In still other forms, the transmission can include a clutch mechanism to disengage the electric machine 74 from the LP shaft 36. Still further, although the embodiment depicted in FIG. 2 includes the speed change device 84, other embodiments need not include the device 84. In such an embodiment, the electric machine 74 is directly connected to the LP shaft 36.

Figure 7A:
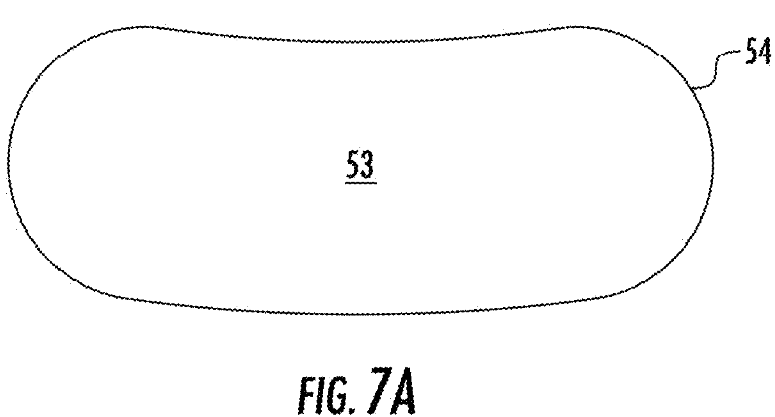
FIG. 7A is a cross sectional view of a non-annular portion of a flow path of an intake channel in accordance with the present disclosure.
Figure 7B:
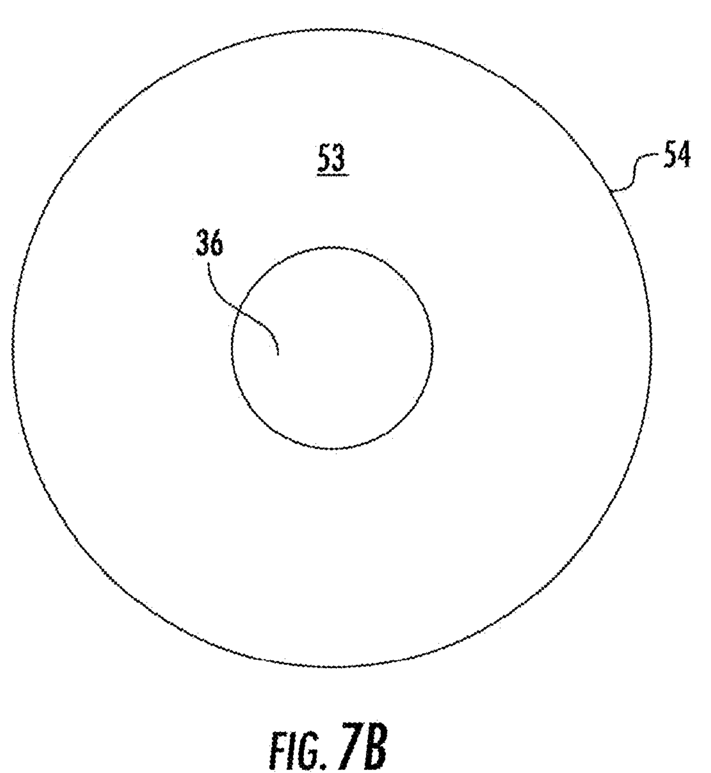
FIG. 7B is a cross sectional view of an annular portion of a flow path of an intake channel in accordance with the present disclosure.

The intake channel 54 forms a flow path between the AGB 80 and the HP compressor 22. The flow path of the intake channel 54 follows the route depicted in FIG. 2, where the inlet portion of air 53 captured by the intake channel 54 passes first through a non-annular inlet 90 depicted at sightline A-A (an embodiment of which is illustrated in FIG. 7A, discussed in more detail below) before it is split into an annular flow path 92 depicted at sightline B-B (an embodiment of which is illustrated in FIG. 7B, discussed in more detail below). The non-annular inlet 90 is radially offset from the LP shaft 36 and confined to a circumferential section about the LP shaft 36. The intake channel 54 takes the form of the annular shape leading up to the delivery of the inlet portion of air 53 to the HP compressor 22. The intake channel 54 thus begins with a non-annular intake shape and ends with an annular shape. As will be appreciated, the annular shape of the intake channel includes a central interior that accommodates the LP shaft 36. The intake channel 54 in the illustrated embodiment is thus required to morph, or change, from the non-annular shape at the inlet 90 to the annular shape at its discharge to the compressor 22 so that the intake channel 54 accommodates the intrusion of the LP shaft 36 through the intake channel 54 and to the electric machine 74. In this way, the LP shaft 36 extends through at least a portion of the intake channel 54 where the flow path in the intake channel 54 changes shape to accommodate the LP shaft 36. In some forms, an exterior surface of the LP shaft 36 may be exposed to the inlet portion of air 53 such that the inlet portion of air 53 flowing in the intake channel 54 is exposed to the rotating exterior surface of the LP shaft 36. In other forms, however, the intake channel 54 may include a separate structure used to define the central interior and which is used to separate the exterior surface of the LP shaft 36 from the inlet portion of air 53 flowing in the intake channel 54.

In some forms, the inlet 90 of the intake channel 54 is located at either a six o-clock position on the nacelle such as what would conventionally be considered the bottom, or underside, of the nacelle. An inlet on a Beechcraft Denali or Beechcraft King Air Turboprop are examples. The exhaust section 32 can be located at either or both of the three o'clock and nine o'clock position on the nacelle such as would conventionally be considered a left or right side of the nacelle. In this manner, the spacing of the inlet 90 of the intake channel 54 is circumferentially displaced from the exhaust section 32 to minimize/prevent exhaust gases from being circulated to the inlet 90 for ingestion into the engine 10. Furthermore, it will be appreciated that the inlet 52, though illustrated at an axially aft location in the various embodiments, can be located forward closer to the blades 40 while still maintaining the configuration to reverse the flow from the direction of the incoming flow of air 50 to the axial flow direction required in the turbine engine configurations depicted.

Also depicted in FIG. 2 is an offtake flow path 86 created by an offtake opening 88 provided in the intake channel 54 and which is configured to provide a flow of offtake air 94 to be used for heat exchange purposes with the electric machine 74. The offtake opening 88 can be located downstream of the inlet 90 to the intake channel 54 and is structured to remove part of the inlet portion of air 53 flowing through the offtake channel 86. The offtake opening 88 can be a permanent vent structure that includes a fixed opening through which air can pass regardless of mode of operation of the electric machine 74. In other forms, however, the offtake opening 88 can include a movable mechanical structure that permits modulating the area of the offtake opening 88, including in some forms fully closing the offtake opening. Such a movable mechanical structure can take any variety of forms such as a hinged plate, sleeve valve, or other suitable device.

The offtake flow path 86 can take a variety of forms including the solid line depicted in FIG. 2 in which the flow path 86 flows past the electric machine 74. In one form, the offtake flow path 86 can alternatively and/or additionally be routed along the dotted line shown in FIG. 2. Such a flow path can provide additional level of venting of the cavity in which the electric machine 74 is located, and/or provide greater dwell time within the cavity to ensure a higher level of heat exchange.

The offtake flow path can include one or more discharge openings 96 and 98 to permit the flow of offtake air 94 to exit from the nacelle 78. The flow of offtake air 94 can be urged to exit through a pressure differential that exists between the offtake opening 88 and the discharge openings 96 and/or 98. Such a pressure differential can be provided via ejector action if needed through suitable structure configured to provide such an action (e.g., a venturi ejector). One or both of the discharge openings 96 and 98, in some embodiments, can be a permanent vent structure that includes a fixed opening through which air can pass regardless of mode of operation of the electric machine 74.

In other forms, however, one or both of the discharge openings 96 and 98 can include a movable mechanical structure that permits modulating the area of the discharge openings 96 and 98, including in some forms fully closing the discharge openings. Such a movable mechanical structure can take any variety of forms such as a hinged plate, sleeve valve, or other suitable device. The moveable mechanical structure can protrude into a passing flow of air to which the discharged flow of offtake air 94 is being discharged, and in other forms can protrude into the offtake flow path 86.

Given the proximity of the electric machine 74 to the intake channel 54 and the configurations disclosed herein, various cooling techniques are contemplated with respect to the various embodiments. For example, though the passing flow of offtake air 94 is illustrated in FIG. 2 passing adjacent and/or around the electric machine 74, in some embodiments, the passing flow of offtake air 94 can be directed to impinge directly upon a portion of the electric machine. Further, a surface of the electric machine 74, such as an outer housing, can form part of the flow path of the offtake flow path 86. In other forms, a structure forming the offtake flow path 86 can be in heat conductive relationship with a portion of the electric machine 74 (e.g., a housing of the electric machine 74).

The embodiment depicted in FIG. 2 also includes a controller 100 configured to control various aspects of the depicted embodiment (the embodiment depicted in FIG. 1 can also include a controller for control of analogous features). As depicted through the various dotted lines, the controller 100 can control one or more different systems associated with operation of the engine 10. The dotted nature depicted in the figure denotes the optional inclusion of one or more, or all, of the systems connected with the controller 100. For example, the controller 100 can be used to control variable stator vanes 70 in either or both turbines 28 and 30. Additionally and/or alternatively, the controller 100 can be used to control variable stator vanes 60 in the compressor 22. Additionally and/or alternatively, the controller 100 can be used to control fuel flow to the combustion section 26. Additionally and/or alternatively, the controller 100 can be used to control one or more of the openings of the openings 88, 96, and 98. Additionally and/or alternatively, the controller 100 can be used to control operation of the electric machine 74. Additionally and/or alternatively, the controller 100 can command fuel flow to the combustion section 26 to be stopped and also simultaneously command the propeller section 14 to be positioned in a forward or reverse pitch configuration.

The controller 100 can thus be used in any or all of the following examples. The controller 100 may selectively drive the electric machine 74 as a generator. In those situations in which the electric machine 74 is 'powered on' to operate as a generator, the controller 100 can make adjustments to fuel rate delivery to the combustion section 26 while also optionally changing position of variable stator vanes 60 and/or 70. The controller 100 can optionally operate a clutch in the speed change device 84.

Figure 3:
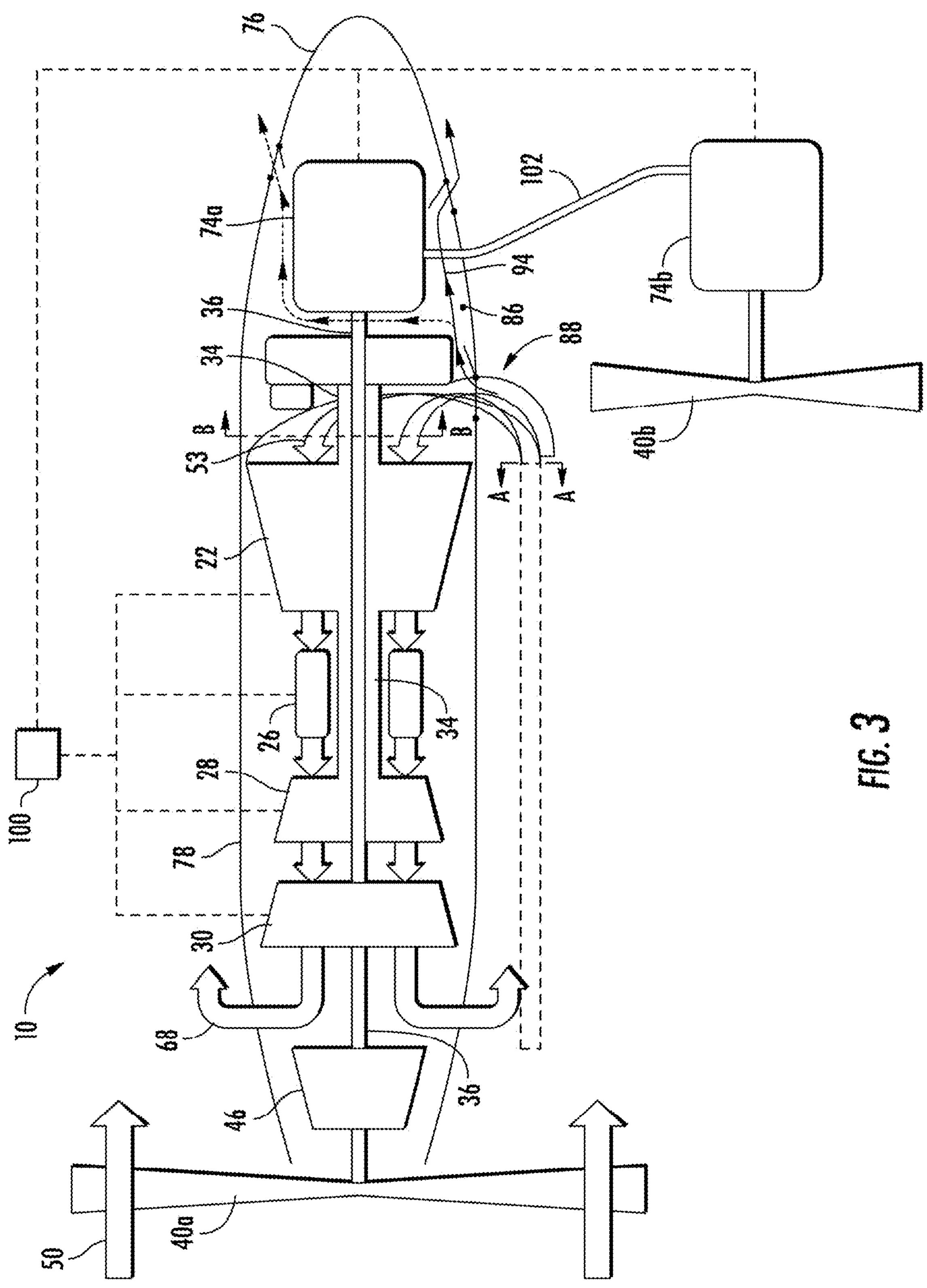
FIG. 3 is a schematic view of a gas turbine engine with an electric machine in accordance with the present disclosure.

Turning now to FIG. 3, another embodiment of the reverse flow engine 10 discussed above is illustrated. The exemplary engine 10 of FIG. 3 may be configured in substantially the same manner as the exemplary engine 10 of FIG. 2, and as such the same or similar numbers may refer to the same or similar parts.

For the embodiment of FIG. 3, the engine 10 includes an electric machine 74 coupled to the engine 10 and operated as a generator, the electric machine 74 further in electrical communication via a power conduit 102 with an electric machine 74*b* which is operated as a motor. The electric machine 74*b* operated as a motor is used to drive a set of propeller blades 40*b* apart from the blades 40*a* driven by the turbine engine 10 depicted at the top of FIG. 3. The electric machine 74*b* configured as a motor can be used to provide additional thrust output beyond that provided by the propeller blades 40*a* driven by the turbine engine 10.

Although the electric machine 74*b* is illustrated apart from any turbomachinery components such as those at the top of the figure, in some embodiments the electric machine 74*b* can be integrated with a gas turbine engine much in the same manner as the turboprop engine 10 depicted at the top of the figure. In these embodiments, the electrical coupling between the electric machines 74*a* and 74*b* can be used to exchange power between the two (e.g., where one machine is a motor and the other a generator) or can be coupled to a common energy storage device (e.g. a bank of batteries). Any of the variations in the embodiments discussed above are also applicable to the embodiments shown in FIG. 3, such as but not limited to heat exchange between the electric machine 74 and the inlet portion of air 53, the offtake flow path 86, etc.

Figure 4:
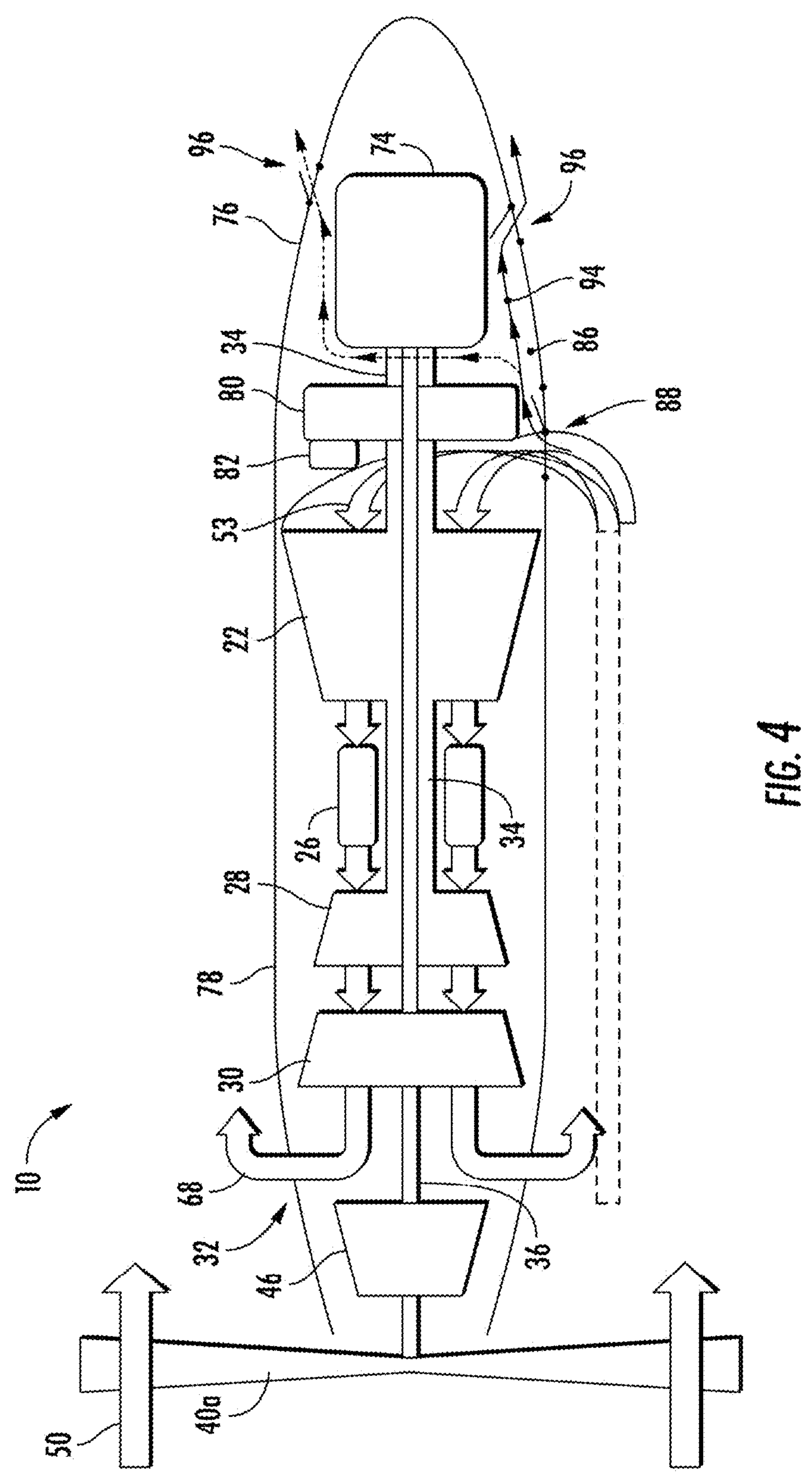
FIG. 4 is a schematic view of a gas turbine engine with an electric machine in accordance with the present disclosure.

Turning now to FIG. 4, another embodiment of the reverse flow engine 10 discussed above is illustrated. The exemplary engine 10 of FIG. 4 may be configured in substantially the same manner as the exemplary engine 10 of FIG. 2, and, as such, the same or similar numbers may refer to the same or similar parts.

For the embodiment of FIG. 4, the engine 10 includes an electric machine 74 coupled to the HP shaft 34 of the engine 10, in which the configuration can employ the electric machine 74 as either a motor (e.g., to start the engine 10) or a generator (e.g., to scavenge power for electric power generation). As will be appreciated in this embodiment, the LP shaft 36 need not be extended to the rear of the engine 10.

Figure 5:
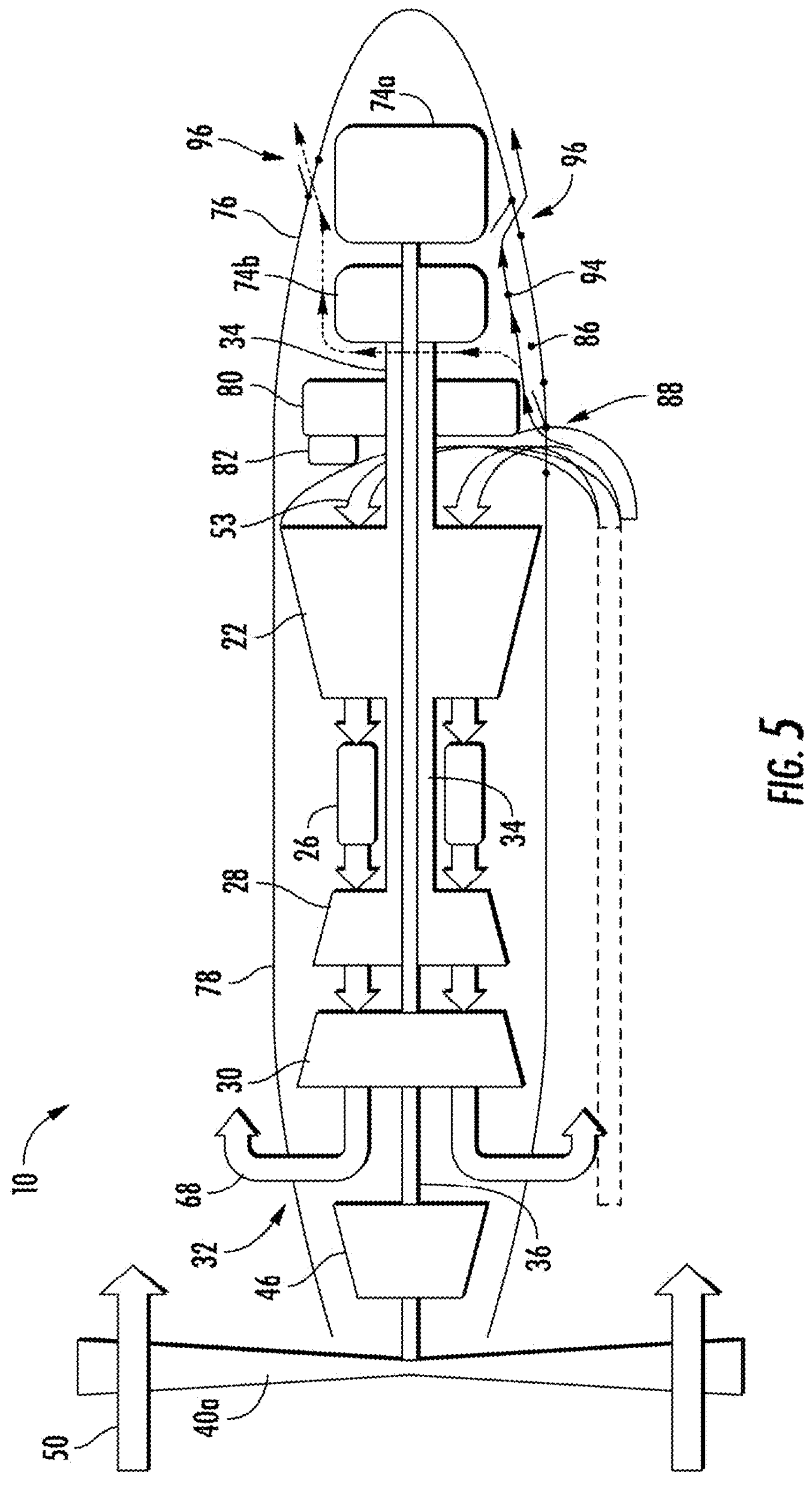
FIG. 5 is a schematic view of a gas turbine engine with an electric machine in accordance with the present disclosure.

Turning now to FIG. 5, another embodiment of the reverse flow engine 10 discussed above is illustrated. The exemplary engine 10 of FIG. 5 may be configured in substantially the same manner as the exemplary engine 10 of FIG. 2, and as such the same or similar numbers may refer to the same or similar parts.

For the embodiment of FIG. 5, the engine 10 includes electric machines 74*a* and 74*b*, each coupled with respective LP shaft 36 and HP shaft 34. This embodiment enables power input/extraction to/from either spool 34,36 independently, as well as the potential to transfer power between the two spools 34,36 of the engine to improve operability/mitigate vibration, compressor stall or instability issues. As will therefore be appreciated, power can be extracted from spool 34 and provided to spool 36 in one mode of operation, power can be extracted from spool 36 and provided to spool 34 in another mode of operation, and power can be either extracted from or provided to both spools 34,36 in yet another mode of operation.

Any of the electric machines discussed herein are capable of being packaged so as to provide power densities suitable for use in the applications discussed herein. For example, the electric machines can have a power density ranging anywhere from greater than 3 kW/kg, greater than 5 kW/kg, and greater than 6 kW/kg.

As noted, the exemplary controller 100 useful in any of FIGS. 2-5 is configured to regulate any of the aforementioned systems such as variable stator vanes 60 and/or 70, electric machine 74, fuel flow to the combustion section 26, etc., either alone or in combination, based on a control scheme stored in the controller 100. In one or more exemplary embodiments, the controller 100 depicted in FIGS. 2 and 3 may be a stand-alone controller 100 for any of the aforementioned systems, or alternatively, may be integrated into one or more of a controller for the gas turbine engine with which the aforementioned systems are integrated, a controller for an aircraft including the gas turbine engine with which the aforementioned systems are integrated, etc.

Figure 6:
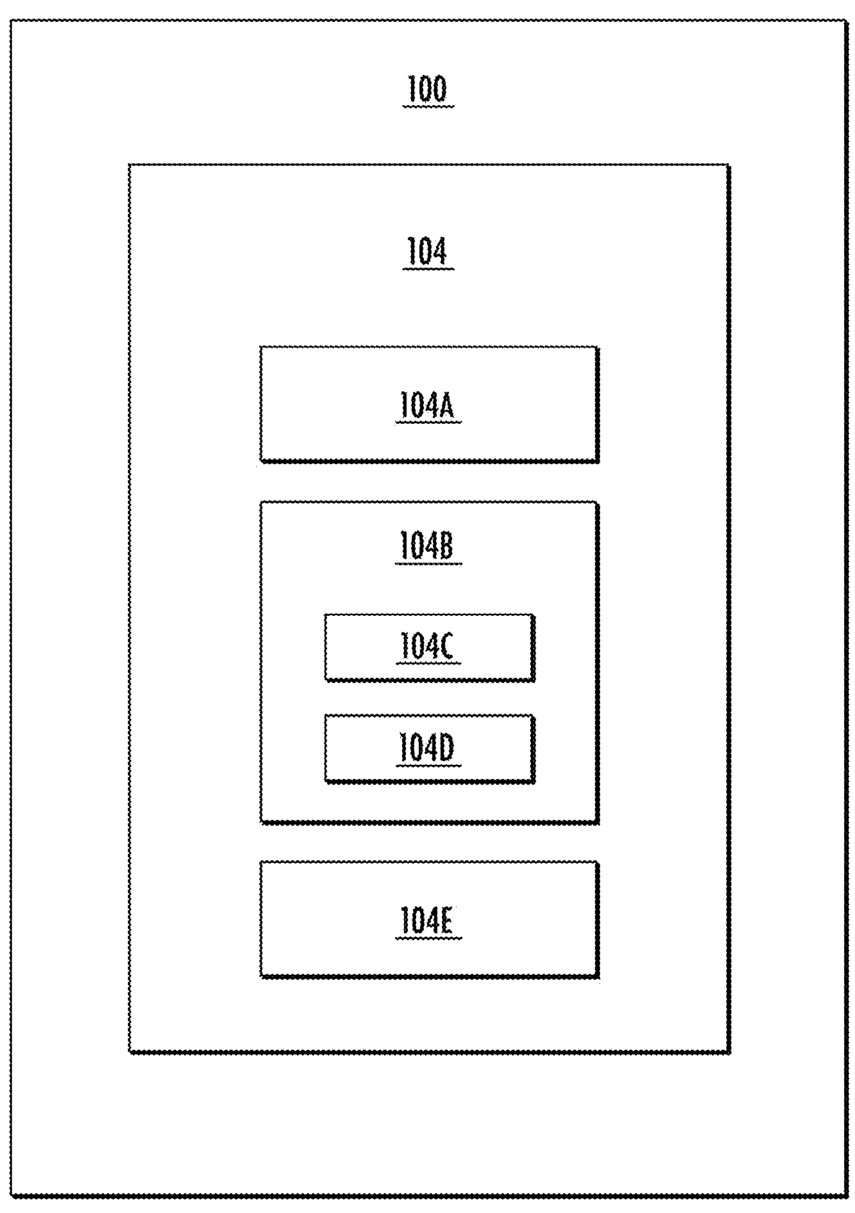
FIG. 6 is a view of a controller in accordance with the present disclosure.

Referring particularly to the operation of the controller 100, in at least certain embodiments, the controller 100 can include one or more computing device(s) 104 such as depicted in FIG. 6. The computing device(s) 104 can include one or more processor(s) 104A and one or more memory device(s) 104B. The one or more processor(s) 104A can include any suitable processing device, such as a microprocessor, microcontroller, integrated circuit, logic device, and/or other suitable processing device. The one or more memory device(s) 104B can include one or more computer-readable media, including, but not limited to, non-transitory computer-readable media, RAM, ROM, hard drives, flash drives, and/or other memory devices.

The one or more memory device(s) 104B can store information accessible by the one or more processor(s) 104A, including computer-readable instructions 104C that can be executed by the one or more processor(s) 104A. The instructions 104C can be any set of instructions that when executed by the one or more processor(s) 104A, cause the one or more processor(s) 104A to perform operations. In some embodiments, the instructions 104C can be executed by the one or more processor(s) 104A to cause the one or more processor(s) 104A to perform operations, such as any of the operations and functions for which the controller 100 and/or the computing device(s) 104 are configured, the operations for any of the aforementioned systems such as variable stator vanes 60 and/or 70, electric machine 74, fuel flow to the combustion section 26, etc., as described herein, and/or any other operations or functions of the one or more computing device(s) 104. The instructions 104C can be software written in any suitable programming language or can be implemented in hardware. Additionally, and/or alternatively, the instructions 104C can be executed in logically and/or virtually separate threads on the one or more processor(s) 104A. The one or more memory device(s) 104B can further store data 104D that can be accessed by the one or more processor(s) 104A. For example, the data 104D can include data indicative of power flows, data indicative of engine/aircraft operating conditions, and/or any other data and/or information described herein.

The computing device(s) 104 can also include a network interface 104E used to communicate, for example, with the other components of system (e.g., via a communication network). The network interface 104E can include any suitable components for interfacing with one or more network(s), including, for example, transmitters, receivers, ports, controllers, antennas, and/or other suitable components. One or more devices can be configured to receive one or more commands from the computing device(s) 104 or provide one or more commands to the computing device(s) 104.

The network interface 104E can include any suitable components for interfacing with one or more network(s), including, for example, transmitters, receivers, ports, controllers, antennas, and/or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Turning now to FIGS. 7A and 7B, cross sectional views of two separate flow stations along the flow path of the intake channel 54 are illustrated. FIG. 7A illustrates view A-A from FIGS. 2 and 3, above, which depicts a cross section of the intake channel 54 that routes an inlet portion of air 53 of the flow of air 50. The cross-section A-A depicted in FIG. 7A is at or close to the inlet of the intake channel 54 and has a non-annular flow shape. The non-annular flow shape depicted in FIG. 7A is similar to a kidney shape in the illustrated embodiment, but other non-annular shapes are also contemplated. The cross-section B-B depicted in FIG. 7B, from FIGS. 2 and 3 above, is at or close to the discharge of the intake channel 54 as it delivers the inlet portion of air 53 of the flow of air 50 to the compressor 22. The annular flow shape depicted in FIG. 7B encloses the LP shaft 36.

Figure 8:
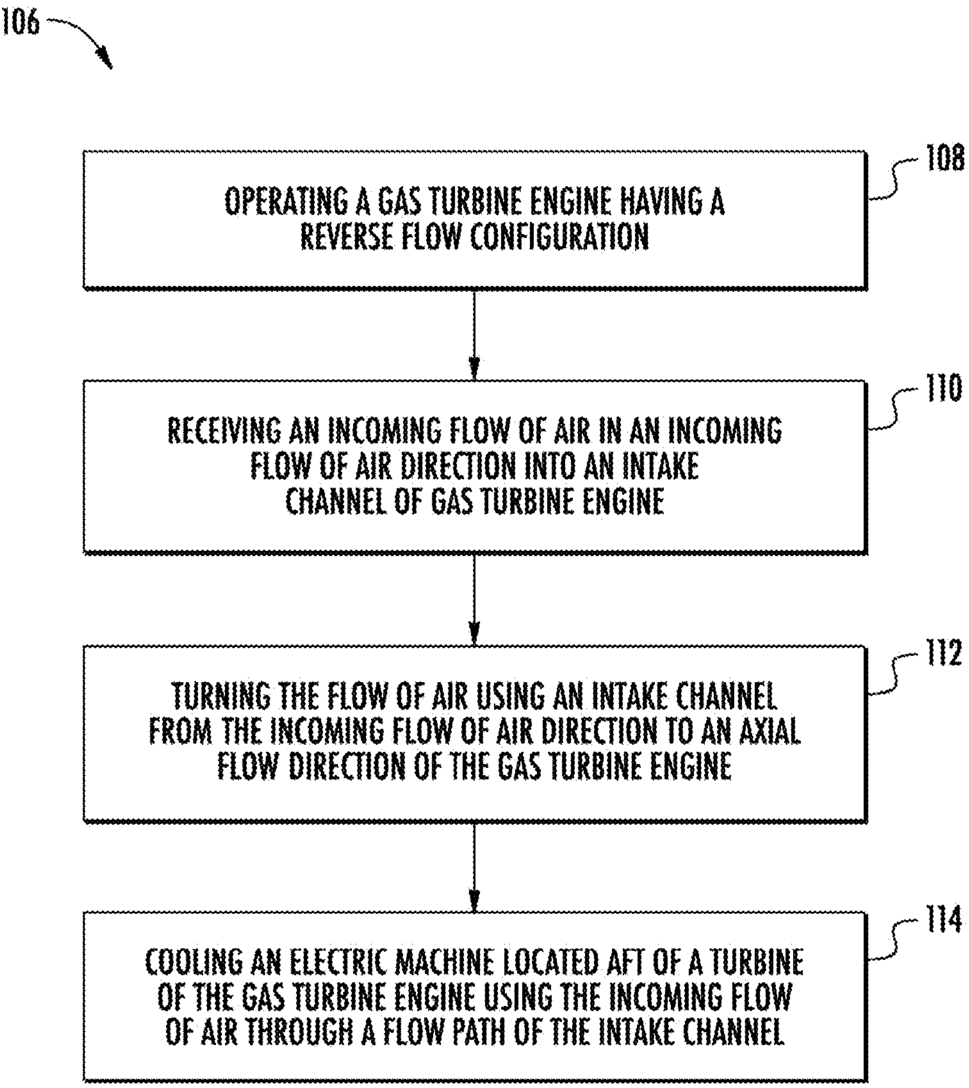
FIG. 8 is a flow chart describing a method of operating a gas turbine engine having an electric machine in accordance with the present disclosure.

Referring now to FIG. 8, a flow diagram of a method of operating a gas turbine engine in accordance with an exemplary aspect of the present disclosure is provided. The method of FIG. 7 may be utilized to operate one or more of the exemplary engine and electric machine placement described above with reference to FIGS. 1 through 5B. Accordingly, it will be appreciated that the method may generally be utilized to operate a gas turbine engine including engine 10, electric machine 74, and intake channel 54. However, in other exemplary aspects, the method may additionally or alternatively be utilized to operate any other suitable gas turbine engine.

More specifically, FIG. 8 discloses a method 106 of operating a reverse flow gas turbine engine which includes at 108 operating a gas turbine engine having a reverse flow configuration. The engine can take the form of a turboprop as discussed above in various embodiments. Step 110 includes receiving an incoming flow of air into an intake channel of the gas turbine engine. The flow of air received in the intake channel is turned at step 112 from its initial flow direction into an axial flow direction of the gas turbine engine. Step 114 discloses cooling an electric machine located aft of a turbine of the gas turbine engine using the flow of air in the intake channel.

The arrangement of the electric machine 74 coupled with the low pressure shaft 36 and located on a side of the high pressure compressor 22 opposite the high pressure turbine 28 provides various technical effects, including the ability to cool the electric machine 74 using the intake flow of air. Such a placement provides for additional separation from hot section components of the engine 10. The electric machine 74 can be placed in proximity to the intake channel 54 at an aft end of the engine 10 in a heat exchange relationship, where the intake flow of air can exchange heat through either or both of conduction and convection with the electric machine 74. In some forms an offtake flow of air can be extracted from the intake flow of air for use in cooling the electric machine 74 in lieu of the intake flow of air for additional flexibility, such as selective cooling provided through activation of discharge openings 96,98. Various other flexible arrangements can also be provided of the electric machine 74, and specifically cooling of the electric machine. For example, an electric machine 74*b* can be coupled with the low pressure shaft 36, while another electric machine 74*a* is coupled with the high pressure shaft 34. Both of electric machines 74*a* and 74*b* can be located on a side of the high pressure compressor 22 opposite the high pressure turbine 28.

In addition to cooling, air flow in the engine 10 can be used to mitigate against ice formation. For example, heat exchange between the electric machine 74 and the compressor 22 can provide heated air useful as an anti-ice air flow through other portions of the engine 10. Hot or heated air can be used in an air flow path to raise engine 10 component temperature to prevent ice build-up. Preventing ice formation and/or build-up can help prevent engine damage, help ensure continued engine operation, and preserve engine operating margin as well as performance, for example.

As will be discussed in further detail below, "anti-ice" air (e.g., air heated to a temperature hot enough to prevent ice formation or melt ice) can be provided to prevent or otherwise impede formation of ice in an air flow path of an engine, such as the engine 10. The anti-ice air can originate from any suitable location in the engine 10, including, but not limited to, the compressor 22.

In certain embodiments, an anti-ice flow passage is oriented to discharge the anti-ice air toward an inner flow surface of the air flow path (e.g., an annular flow path, non-annular flow path, a non-annular flow path that becomes an annular flow path, etc., as described above). In one embodiment, the anti-ice air is discharged with sufficient energy to impinge on the inner flow surface of the annular flow path.

In certain embodiments, the anti-ice air can be routed to a shaft side cavity to aid in warming the structure to discourage formation of ice. Alternatively or additionally, the anti-ice air can be discharged back through an outlet port provided in a component defining an inner flow surface of the air flow path. Alternatively or additionally, anti-ice air can be provided from a sump of the gas turbine engine, through a shaft side passage.

In certain embodiments, anti-ice air can be provided and routed via an inlet guide vane to the compressor (e.g., the compressor 22). The inlet guide vane can include an internal passage routed to a tip region that includes an anti-ice flow passage oriented to discharge the anti-ice air toward an inner flow surface of an annular flow path within which the inlet guide vane is located. The anti-ice flow passage can include a flow port through which the anti-ice air is discharged. In some embodiments, the anti-ice air is discharged with sufficient energy to impinge on the inner flow surface of the air flow path. The anti-ice air can be discharged through a flow port at the tip edge toward the inner flow path surface, or through flow ports on the leading edge. In other embodiments, the anti-ice air can exit the inlet guide vane into a shaft side passage defined in a component forming the inner flow path surface of the annular flow path.

Figure 9:
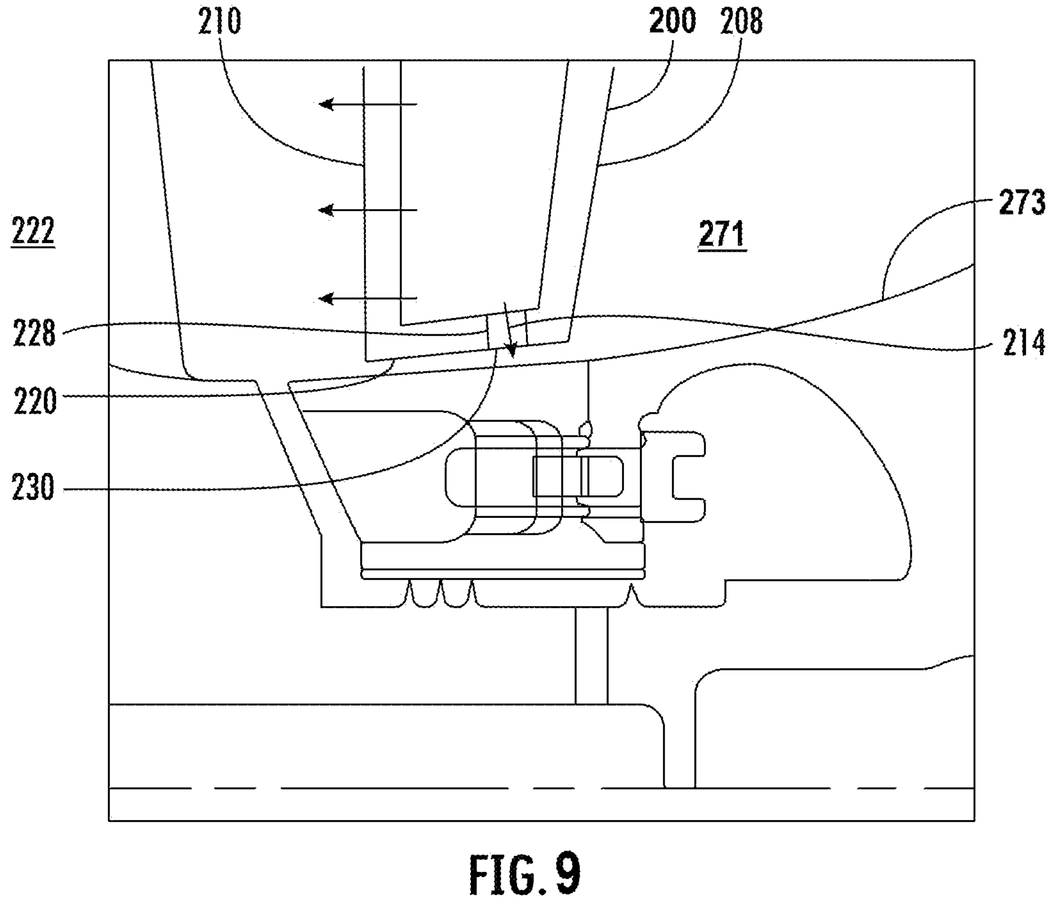
FIG. 9 shows an embodiment of an inlet with guide vane additionally including an anti-ice flow passage.

Turning now to FIG. 9, an embodiment of an inlet guide vane 200 of the instant application can additionally include an anti-ice flow passage 228 oriented to discharge anti-ice air 214 through a flow port 230 at a tip edge 220 in a direction substantially radially inward toward an inner flow surface of the intake channel 54, the annular flow path 92, and/or other air flow path. Such a flow path that progresses radially from a root region 226 and through a tip region 222 promotes more effective heat transfer and therefore discourages formation of ice in the tip region 222, inner flow surface, etc. That is, the flow-through configuration of the embodiment depicted in FIG. 9 energizes an internal air flow along the entire leading edge of the guide vane 200. In addition, a gap between the tip edge 220 and an inner flow surface 273 of an air flow path 271 shown in the example of FIG. 9 can be such that the energy of the flow of anti-ice air 214 can impinge upon the inner flow surface 273 or otherwise flow in close enough proximity to discourage formation of ice. For example, the interaction of the working fluid through the annular flow path 271 and the discharged anti-ice air 214 may permit impingement of the anti-ice air 214 to form a stagnation streamline on the inner flow surface 273, but in other embodiments such impingement or other sufficient interaction creates a region of flow mixing to a degree to discourage formation of ice. The flow port 230 can take on any number of configurations, including any number of cross-sectional shapes and areas. In one form, the flow port 230 is circular in shape, while in another it can be a slot configuration, to set forth just two non-limiting examples. Further, the flow port 230 can be located at any chord location along the tip edge. In some embodiments, the inlet guide vane 200 can include two or more flow ports 230. Given the complementary shape of the tip edge 220 to the inner flow surface 273, the orientation of the anti-ice air 214 can have an axial directional component, but it will be appreciated that the predominate directional component is radial. Still further, though the direction of the anti-ice air 214 can be orthogonal to the inner flow surface 273, in some forms the direction can be at an angle to the inner flow surface 273. The anti-ice flow passages 228 are oriented to discharge anti-ice air 214 through a flow port 230 in a direction substantially radially inward toward the inner flow surface 273.

Figure 10:
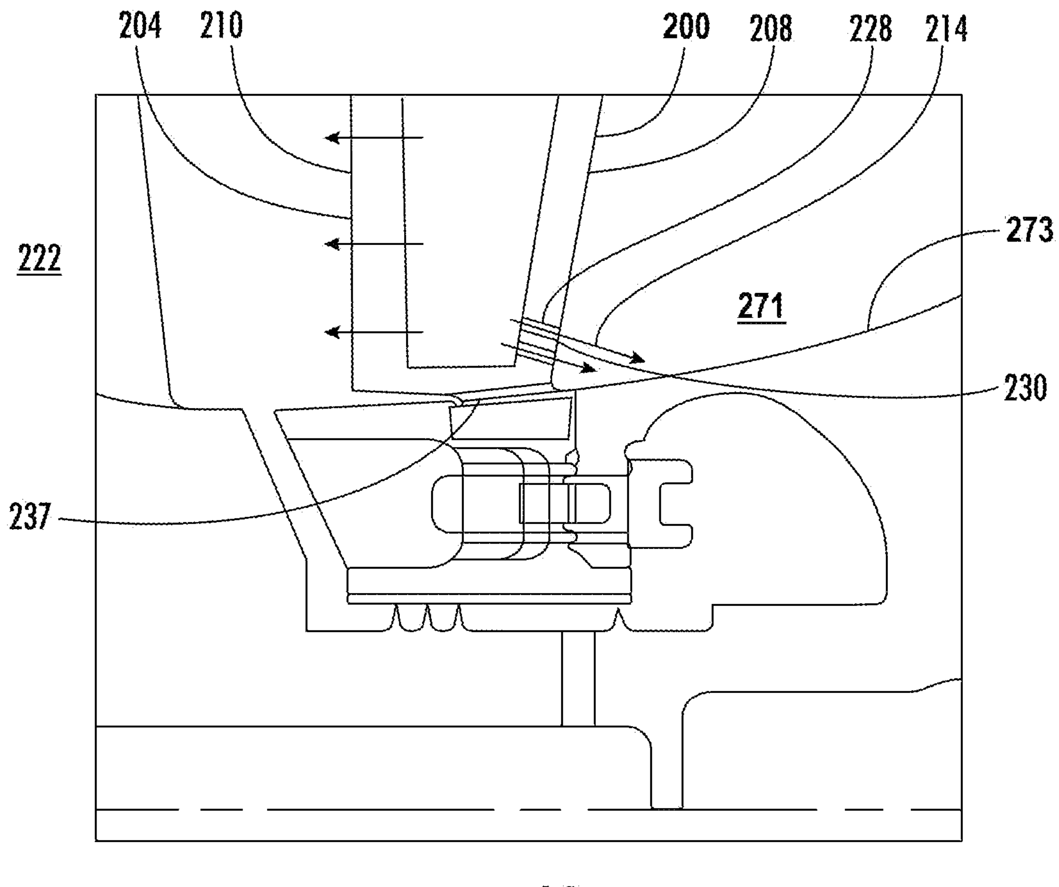
FIG. 10 discloses an additional exemplary embodiment of an inlet guide vane having a plurality of anti-ice flow passages.

FIG. 10 discloses an additional exemplary embodiment of the inlet guide vane 200 having a plurality of anti-ice flow passages 228 positioned in the tip region 222 and located at the leading edge 208 of the airfoil section 204. The anti-ice flow passages 228 are oriented to discharge anti-ice air 214 from the leading edge 208 and through respective flow ports 230. The anti-ice flow passages 228 are oriented to include a radially inward directional component toward the inner flow surface 273, as well as an axially forward directional component (e.g., oriented in an upstream direction relative to the flow of working fluid through the annular flow path 271) such that the anti-ice air 214 is discharged in an upstream direction and against a direction of a working fluid in the annular flow path 271. Discharge of the anti-ice air 214 through the flow ports 230 can be such that the energy of the flow of anti-ice air 214 can impinge upon the inner flow surface 273 or otherwise flow in close enough proximity to discourage formation of ice. For example, the interaction of the working fluid through the annular flow path 271 and the discharged anti-ice air 214 may permit impingement of the anti-ice air 214 to form a stagnation streamline on the inner flow surface 273, but, in other embodiments, such impingement or other sufficient interaction creates a region of flow mixing to a degree to discourage formation of ice. The inner flow surface 273 in proximity to the flow ports 230 can thus be warmed, and surrounding areas of the inner flow surface 273 as well, to such a degree as to discourage formation of ice. The flow ports 230 can take on any number of configurations, including any number of cross-sectional another inlet guide vane with anti-ice air provided to a tip of the inlet guide vane in accordance with another exemplary aspect of the present disclosure shapes and areas. In one form, the flow ports 230 are circular in shape, while in another the flow ports 230 can be in a slot configuration, to set forth just two non-limiting examples. In some embodiments, the inlet guide vane 200 can include fewer or greater numbers of flow ports 230 at the leading edge 208.

Figure 11A:
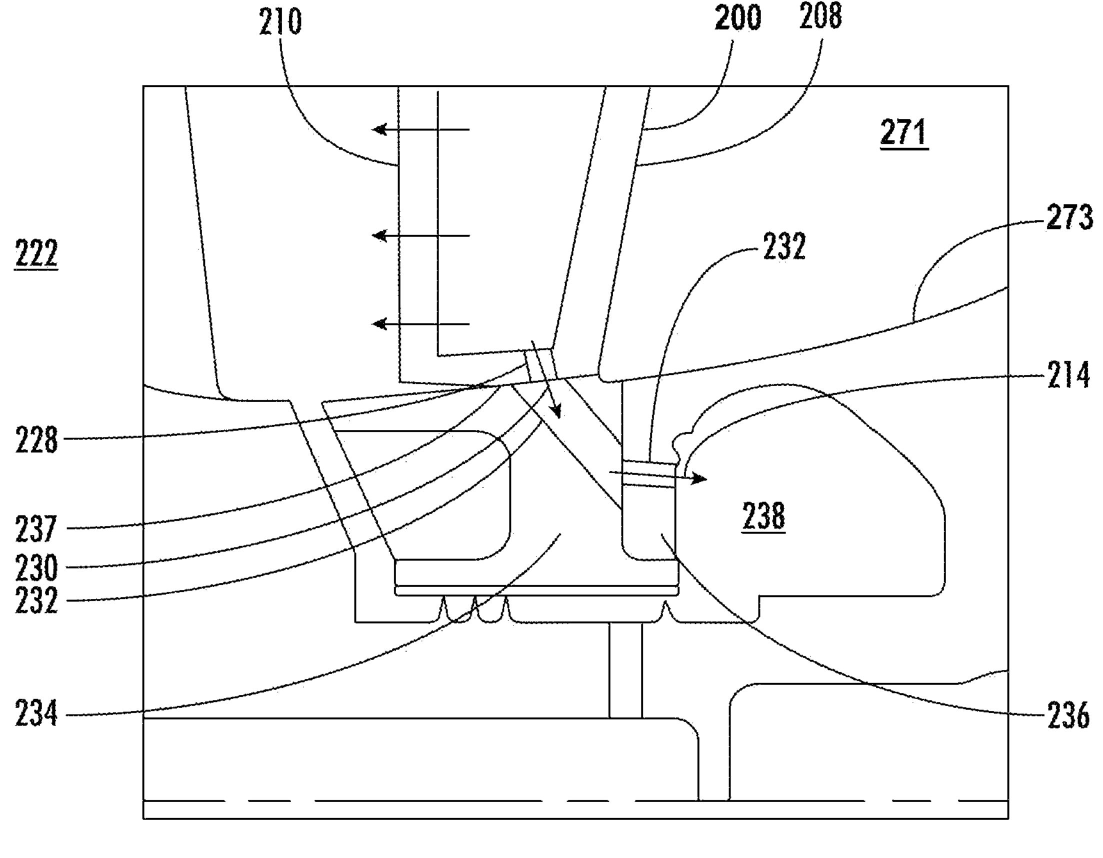
FIG. 11A shows an additional exemplary embodiment of an inlet guide vane with an anti-ice flow passage.

FIG. 11A discloses an additional exemplary embodiment of the inlet guide vane 200 in which an anti-ice flow passage 228 in the tip region 222 is configured to deliver anti-ice air 214 into a shaft side passage 232 formed in a component 234 that is used at least in part to define the inner flow surface 273 of the annular flow path 271. The inlet guide vane 200 can include a protrusion 237 located at the tip to improve mechanical engagement between the guide vane 200 and the component 234 and to discourage leakage of the anti-ice air 214 at the intersection of the inlet guide vane 186 and the component 234. As will be appreciated, the protrusion 237 at the tip may not extend entirely from the leading edge to the trailing edge and thus a gap can nevertheless still be formed between the inlet guide vane 200 and the component 234. In one embodiment, the protrusion 237 can take the form of a button, and the component 234 may have a larger recess used to receive the button (see FIG. 11B which illustrates the shaft side passage formed through the button 235). In still another embodiment, the inlet guide vane 200 may include the structure depicted in FIGS. 11A-B labelled as component 234 radially inward from the inner flow surface 273 such that the anti-ice flow passage 228 is integral with the shaft side passage 232. The shaft side passage 232 can take on any variety of forms, have any variety of lengths, and have any variety of cross-sectional shapes. In the illustrated embodiment, the shaft side passage 232 is also formed in another component 236, but not all embodiments of the inlet guide vane 200 need include a shaft side passage 232 in a plurality of components. In the illustrated embodiment, the shaft side passage 232 is used to deliver anti-ice air 214 to a location forward (e.g., in a direction that extends away from the trailing edge 210 and toward the leading edge 208) of the inlet guide vane 200. Other embodiments, however, may include routing the anti-ice air 214 to other locations. The anti-ice air 214 can be delivered to a shaft side cavity 238 which can be used to warm the material of the inner flow surface 273 in proximity to the shaft side cavity 238 and discourage formation of ice on the inner flow surface 273 in that region. The shaft side cavity 238 can be located forward of the leading edge 208 of the inlet guide vane 200, and in some embodiments can extend circumferentially to a location forward of a neighboring inlet guide vane 200 to aid in warming the inner flow surface 273 in those locations to discourage formation of ice.

Figure 11B:
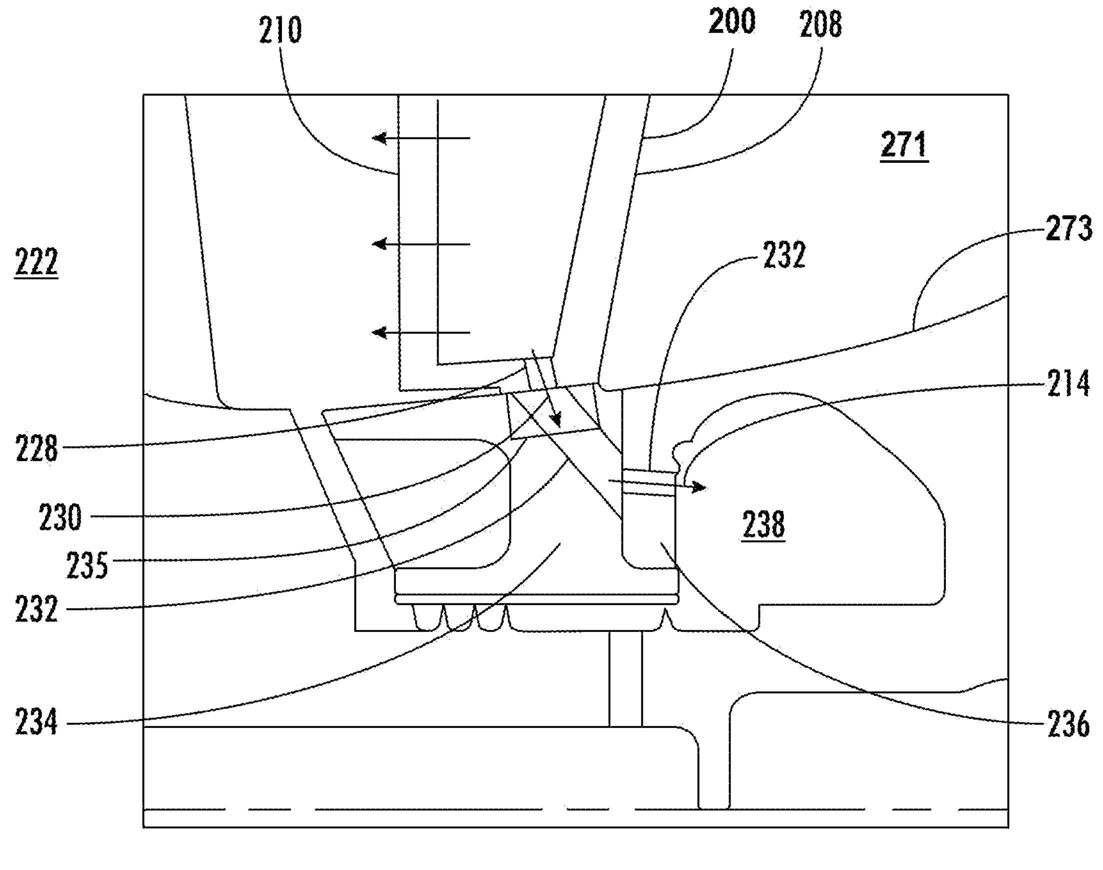
FIG. 11B shows an additional exemplary embodiment of an inlet guide vane with an anti-ice flow passage.
Figure 12:
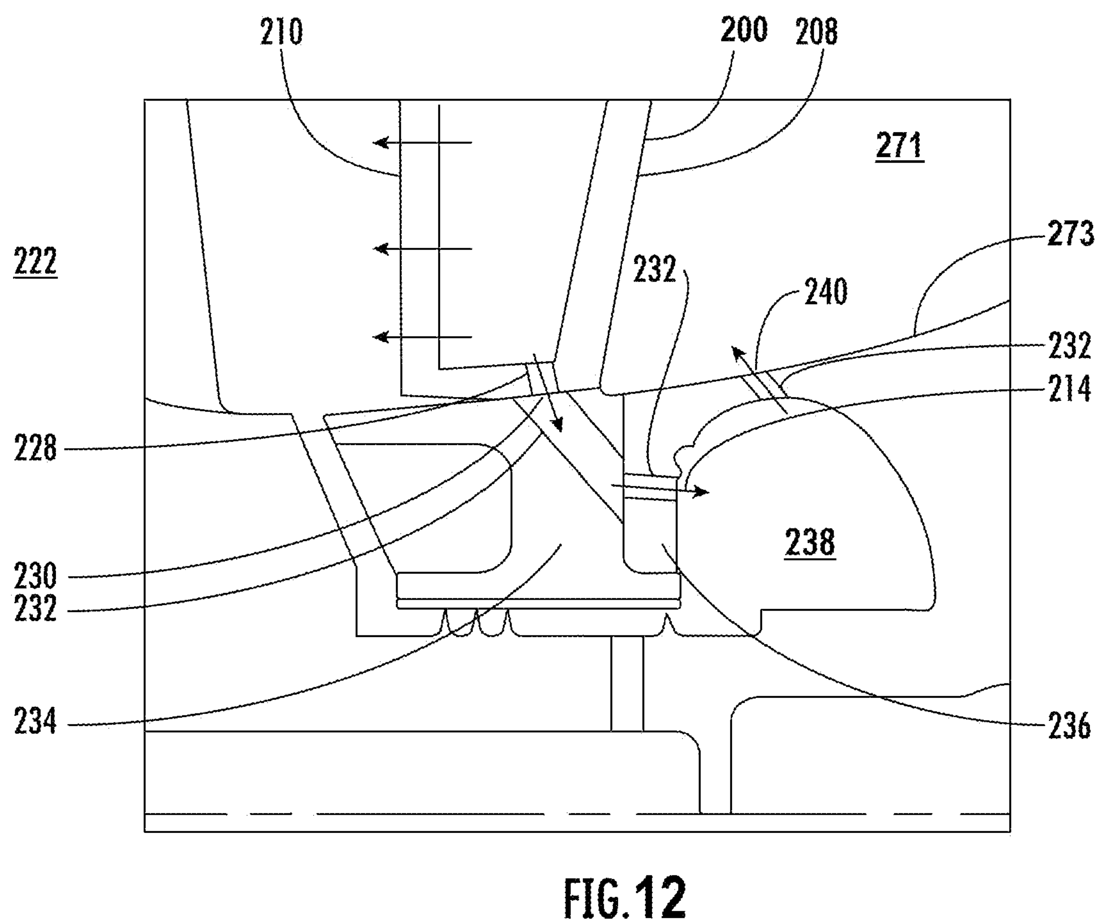
FIG. 12 illustrates an embodiment using shaft side passages of FIGS. 11A-B to deliver anti-ice air to an outlet port.

FIG. 12 illustrates an embodiment using the shaft side passages 232 of FIGS. 11A-B to deliver anti-ice air 214 to an outlet port 240 formed in the inner flow surface 273 defined by the component 236 and located upstream from the inlet guide vane 200. The outlet port 240 can take a variety of forms and cross-sectional shapes. For example, in one form, the outlet port 240 can be a plurality of circular openings, while in another it may be a slot configuration. Furthermore, the outlet port 240 can emit anti-ice air 214 in any variety of directions. In the illustrated embodiment, the outlet port 240 discharges the anti-ice air 214 at an angle to the inner flow surface 273 such that the angle includes a directional component in the downstream direction. In other embodiments, however, the outlet port 240 may discharge anti-ice air 214 having a directional component in the upstream direction or perpendicular to the flow. Though only one outlet port 240 is illustrated in FIG. 12, other embodiments can include additional outlet ports 240, whether located immediately forward of the leading edge 208 or distributed circumferentially to locations near neighboring inlet guide vanes 200.

Figure 13:
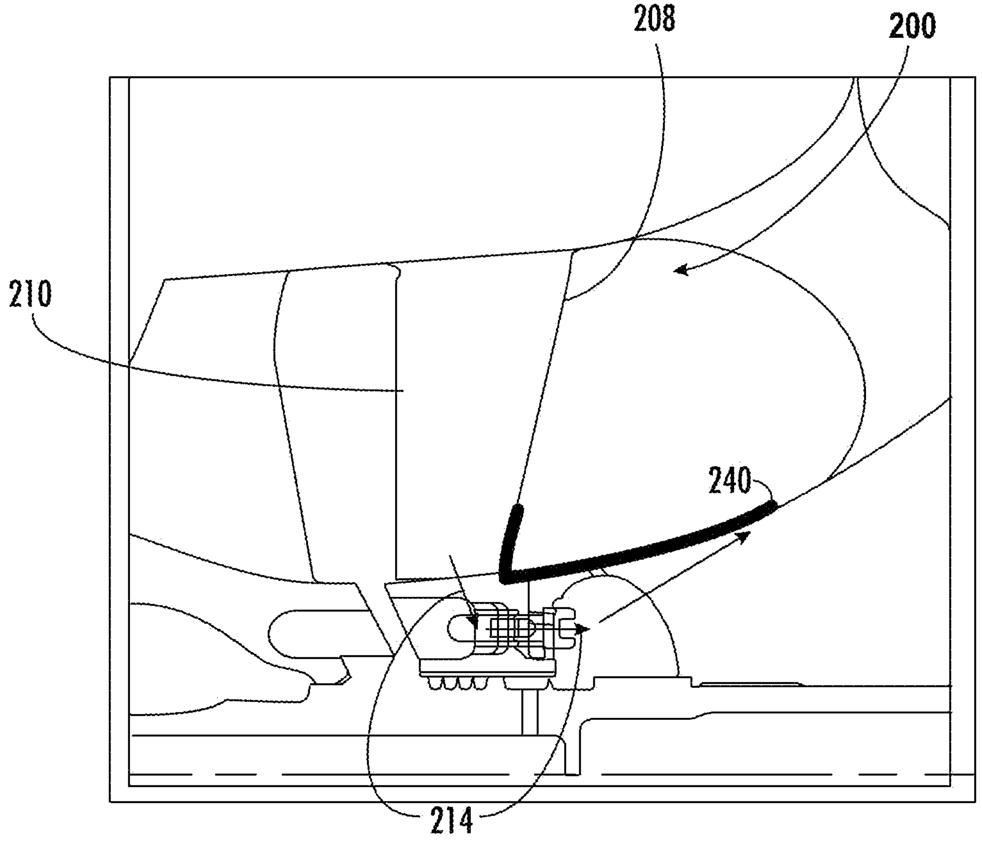
FIG. 13 is a simplified schematic of a variation of the embodiment depicted in FIG. 12.

FIG. 13 is a simplified schematic of a variation of the embodiment depicted in FIG. 12 in which the outlet port 240 has been moved relative to the position indicated in FIG. 12 to a location further upstream of the inlet guide vane 200 having the trailing edge 210 and leading edge 208. As above, the outlet port 240 can take a variety of forms and cross-sectional shapes. For example, in one form, the outlet port 240 can be circular, while in another it may be a slot configuration. Furthermore, the outlet port 240 can emit anti-ice air 214 in any variety of directions. In the illustrated embodiment, the outlet port 240 discharges the anti-ice air 214 at an angle to the inner flow surface 273 such that the angle includes a directional component in the upstream direction. In other embodiments, however, the outlet port 240 may discharge anti-ice air 214 having a directional component in the downstream direction. Though only one outlet port 240 is illustrated in FIG. 13, other embodiments can include additional outlet ports 240, whether located forward of the leading edge 208 or distributed circumferentially to locations near neighboring inlet guide vanes 200.

With respect to the distance upstream from the leading edge 208 at which the outlet port 240 is located in the embodiment of FIG. 13, it is contemplated that the outlet port 240 can be located anywhere within four chord lengths of the leading edge 208. The chord length is generally understood as the distance between the leading edge 208 and the trailing edge 210 of the inlet guide vane 200. In cases of highly cambered airfoil sections 204, the chord length can be the straight-line distance between the points of the camber line associated with the leading edge and trailing edge. The chord length can also be determined by a mean aerodynamic chord or the average chord length in cases of tapered and/or swept airfoil sections 204. Any suitable measure of chord is contemplated.

Figure 14:
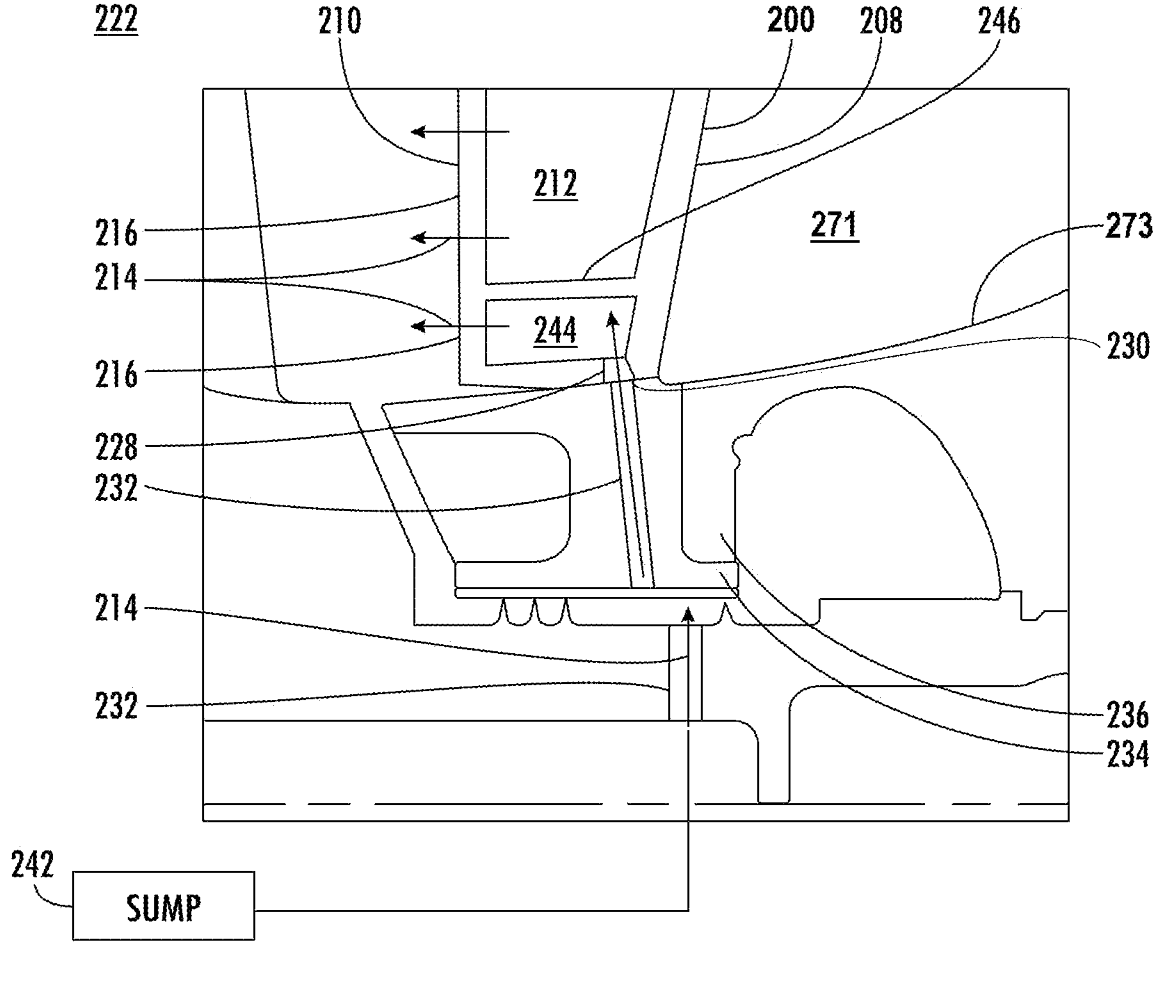
FIG. 14 depicts an exemplary embodiment of an inlet guide vane with anti-ice flow passage.

FIG. 14 depicts an exemplary embodiment of the inlet guide vane 200 in which an anti-ice flow passage 228 in the tip region 222 is configured to receive anti-ice air 214 from a shaft side passage 232 formed in a component 234 that is used at least in part to define the inner flow surface 273 of the annular flow path 271. The inlet guide vane 200 can include a button 235 located at the tip to engage with the component 234 to discourage leakage of the anti-ice air 214 at the intersection of the inlet guide vane 200 and the component 234. The button 235 can be a protrusion of the inlet guide vane 200 formed to close a gap between the inlet guide vane 200 and the component 234. In one embodiment, the button 235 can take the form of a vane extension, and the component 234 may have a larger recess used to receive the vane extension. In still another embodiment, the inlet guide vane 200 may include the structure depicted in FIG. 14 labelled as component 234 positioned radially inward from the inner flow surface 273 such that the anti-ice flow passage 228 is integral with the shaft side passage 232. The shaft side passage 232 can take on any variety of forms, have any variety of lengths, and have any variety of cross-sectional shapes. In the illustrated embodiment, the shaft side passage 232 is also formed in another component 236, but not all embodiments of the inlet guide vane 200 need include a shaft side passage 232 in a plurality of components. In the illustrated embodiment, the shaft side passage 232 is used to deliver anti-ice air 214 from a sump 242 of the gas turbine engine 10. As will be appreciated, the flow of anti-ice air 214 from the sump 242 may not be regulated as above with respect to regulation of anti-ice air 214 and may instead be delivered at a rate, temperature, and pressure commensurate with an operating condition of the gas turbine engine 10. In some embodiments, the flow of anti-ice air 214 from the sump 242 can be part of a. The anti-ice air 214 routed through the shaft side passage 232 and into the anti-ice flow passage 228 can be received in a tip cavity 244 of the inlet guide vane 200. The anti-ice air 214 can be used to warm the tip region 222 of the inlet guide vane 200 to discourage the formation of ice. The tip cavity 244 is in further communication with the discharge port 216 located at the trailing edge 210 of the inlet guide vane 200. As above, the discharge port 216 can take on a variety of forms, shapes, and sizes. The tip cavity 244 can be separated from the internal cavity 212 by a dam 246 used to segregate the flow of anti-ice air 214.

Several embodiments above are capable of being combined with others. For example, FIG. 10 can be combined with any of FIGS. 11-13. As another example, the flow ports provided in FIGS. 9 and 10 can be applied to the embodiment in FIG. 14. Furthermore, although the embodiments described in FIGS. 9-14 relate to an inlet guide vane 200, the disclosure herein can also be applied to other vanes and/or engine flow path structures and associated surfaces, such as, but not limited to, vanes 60, 70, etc.

Figure 15:
FIG. 15 discloses a method to provide anti-ice air to a compressor section.
Figure 15:
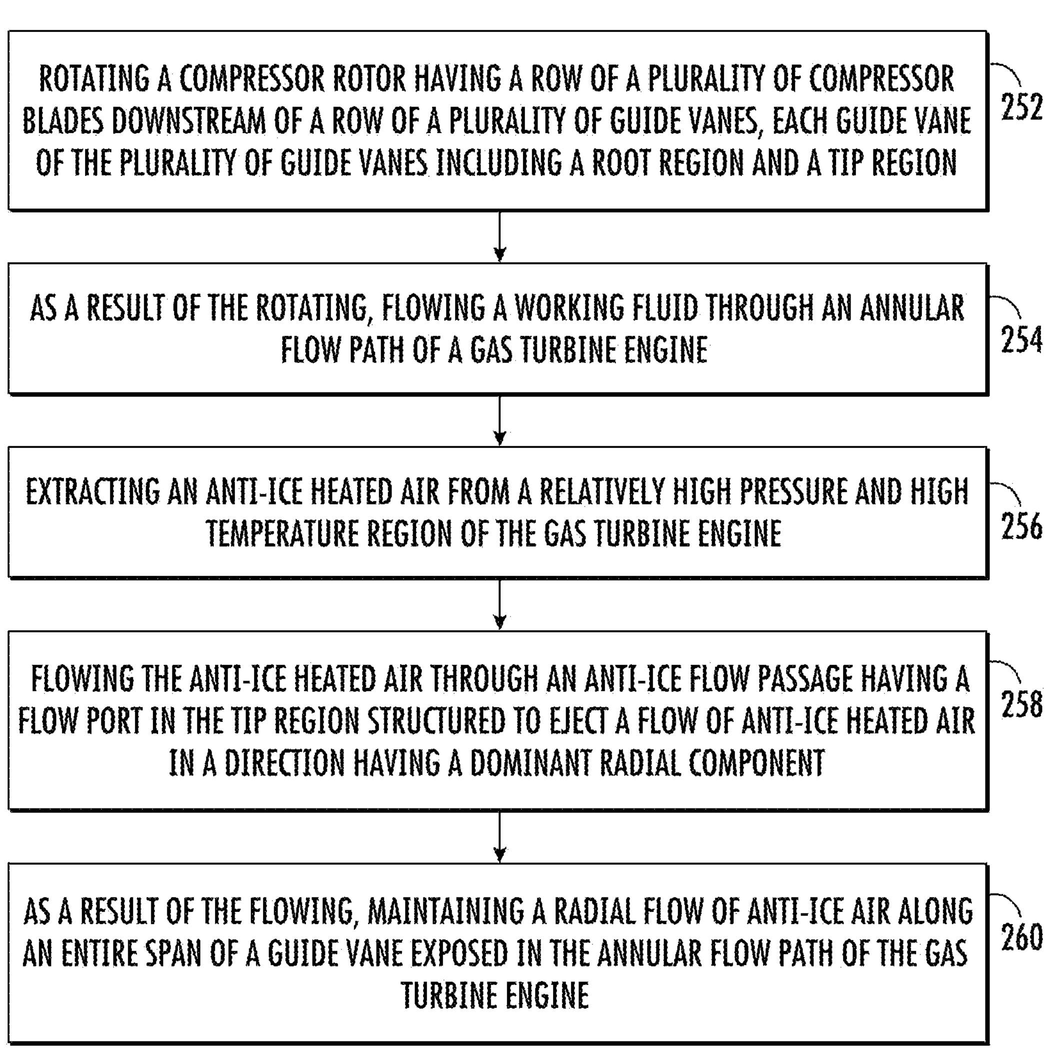

FIG. 15 discloses a method 250 to provide anti-ice air to a compressor section (e.g., the compressor 22) of a gas turbine engine 10 which includes at step 252 of rotating a compressor rotor having a row of a plurality of compressor blades (e.g., fan blades are one non-limiting form of a compressor blade, with other suitable compressor blades found in the compressor 22) downstream of a row of a plurality of guide vanes (e.g., vanes 200, with other suitable guide vanes found in the compressor 22). It will be appreciated herein the reference to "compressor blades" can refer to circumferential arrangements of axial compressor blades used in axial flow compressors, as well as circumferential arrangements of centrifugal compressor blades used on the face of impellers in centrifugal flow compressors. Each guide vane 200 of the plurality of guide vanes including a root region 226 and a tip region 222. As a result of the rotating from step 252, step 254 includes flowing a working fluid through an annular flow path 271 of the gas turbine engine 10. Step 256 includes extracting an anti-ice air 214 from a relatively high pressure and high temperature region of the gas turbine engine 10. Step 258 includes flowing the anti-ice air 214 through an anti-ice flow passage 228 having a flow port 230 in the tip region 222 structured to eject a flow of anti-ice air 214 in a direction having a dominant radial component. As a result of step 258, step 260 includes maintaining a radial flow of anti-ice air in the internal cavity along an entire span of the guide vane exposed in the annular flow path of the gas turbine engine.

Alternatively and/or additionally, in certain embodiments, when ice forms and other foreign objects enter the engine, a screen can be provided to help prevent such objects from entering and damaging the engine. For example, a screen can be provided at the intake 54 to prevent ice and/or other debris/object from entering and damaging the compressor 22 and/or other engine component. Such a screen can include an assembly of screen members that form a plurality of screen cells and at least a portion of the screen cells define an irregular configuration.

In exemplary embodiments, a screen includes an assembly of screen members that form a plurality of screen cells and a barrier screen member that extends into a cavity of each of the screen cells. Each of the barrier screen members terminates at an open end and the open end of each of the barrier screen members do not touch any portion of the screen cells. As such, the screen eliminates portions of the screen members to reduce aerodynamic losses while maintaining the same foreign object protection. Furthermore, the screen design also reduces the overall weight of the screen.

Figures 16, 17:
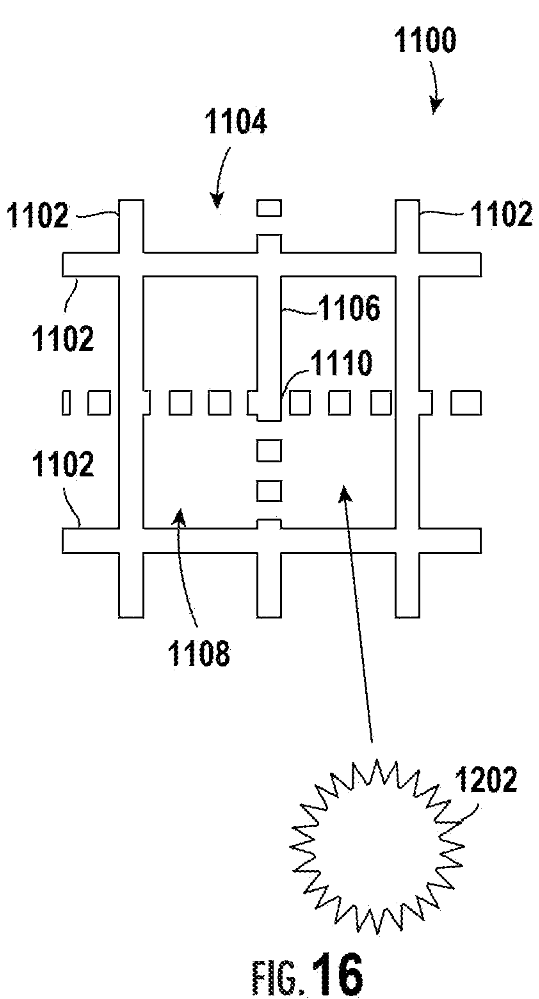
FIG. 16 shows a configuration of a screen for an air intake portion of a machine.
FIG. 17 shows a configuration of a screen for an air intake portion of a machine.

Referring to FIGS. 16 and 17, a first configuration of a screen 1100 for an air intake portion of a machine, e.g., the intake channel 54 of the engine 10, is shown. In exemplary embodiments, the screen 1100 includes an assembly of screen members 1102 that form a plurality of screen cells 1104, and each of the screen cells 1104 includes a portion of screen removed as described herein.

Figures 18, 19, 20:
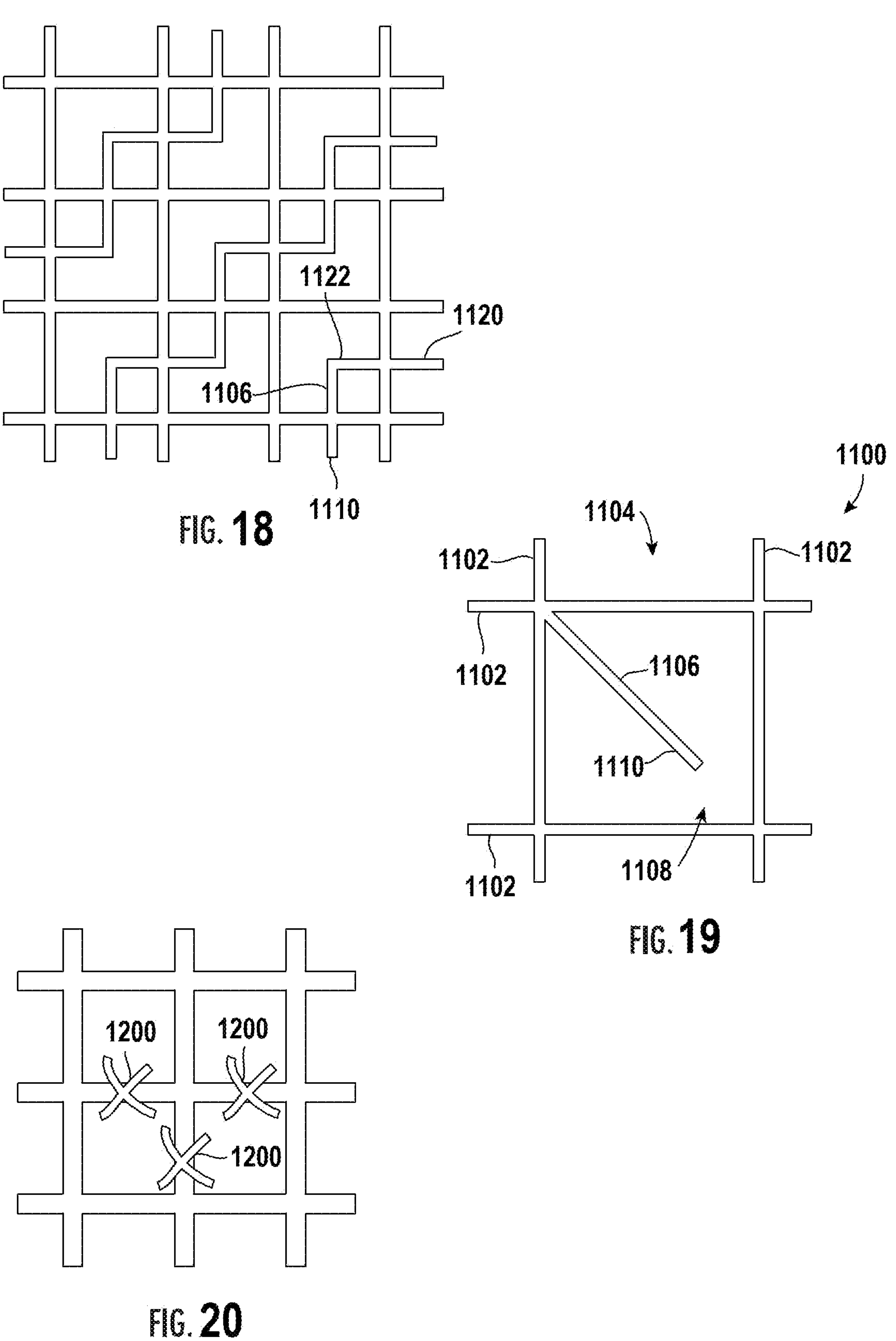
FIG. 18 shows a configuration of a screen for an air intake portion of a machine.
FIG. 19 shows a configuration of a screen for an air intake portion of a machine.
FIG. 20 shows a configuration of a screen for an air intake portion of a machine.
Figure 21:
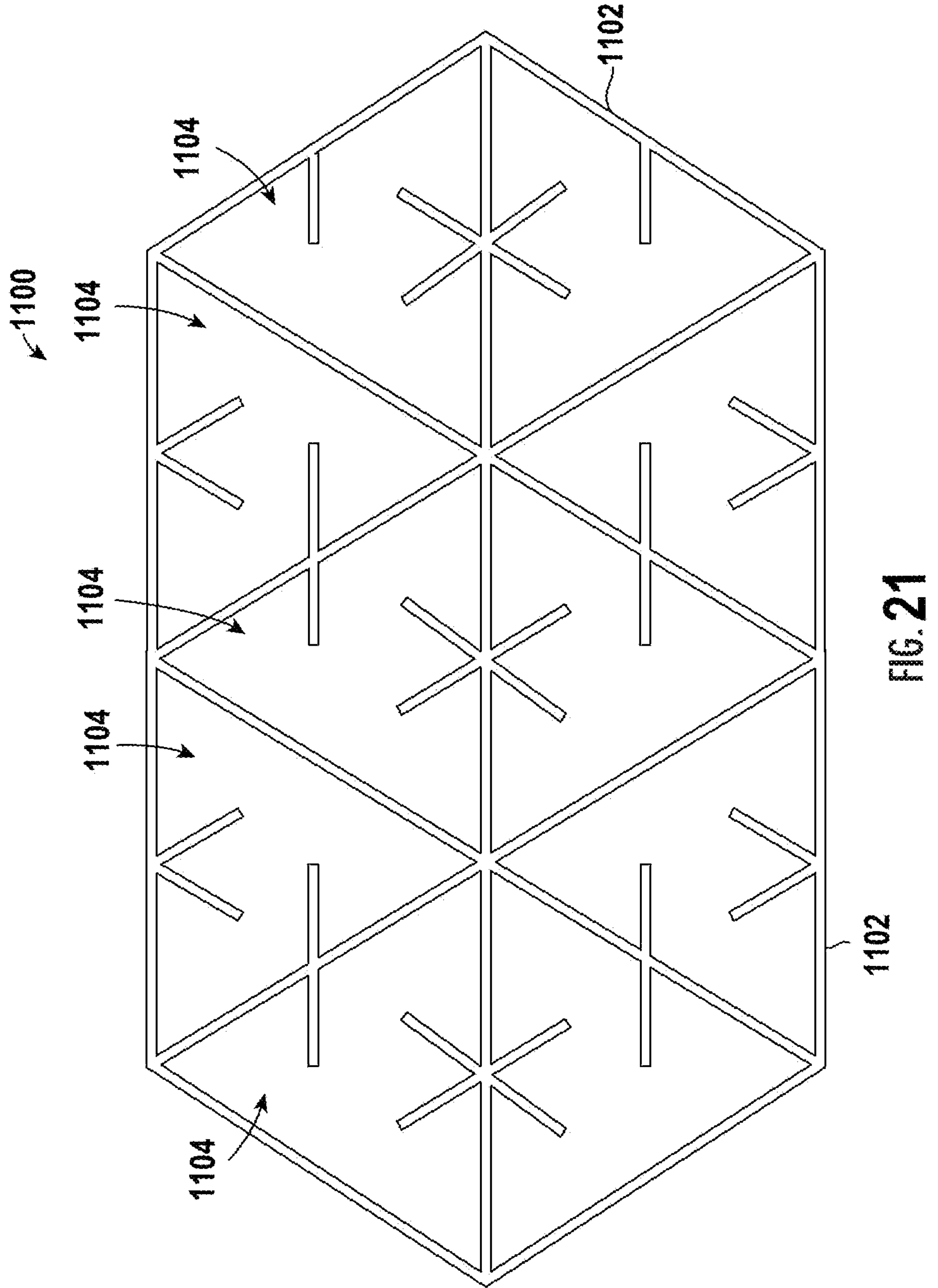
FIG. 21 shows a configuration of a screen for an air intake portion of a machine.
Figure 22:
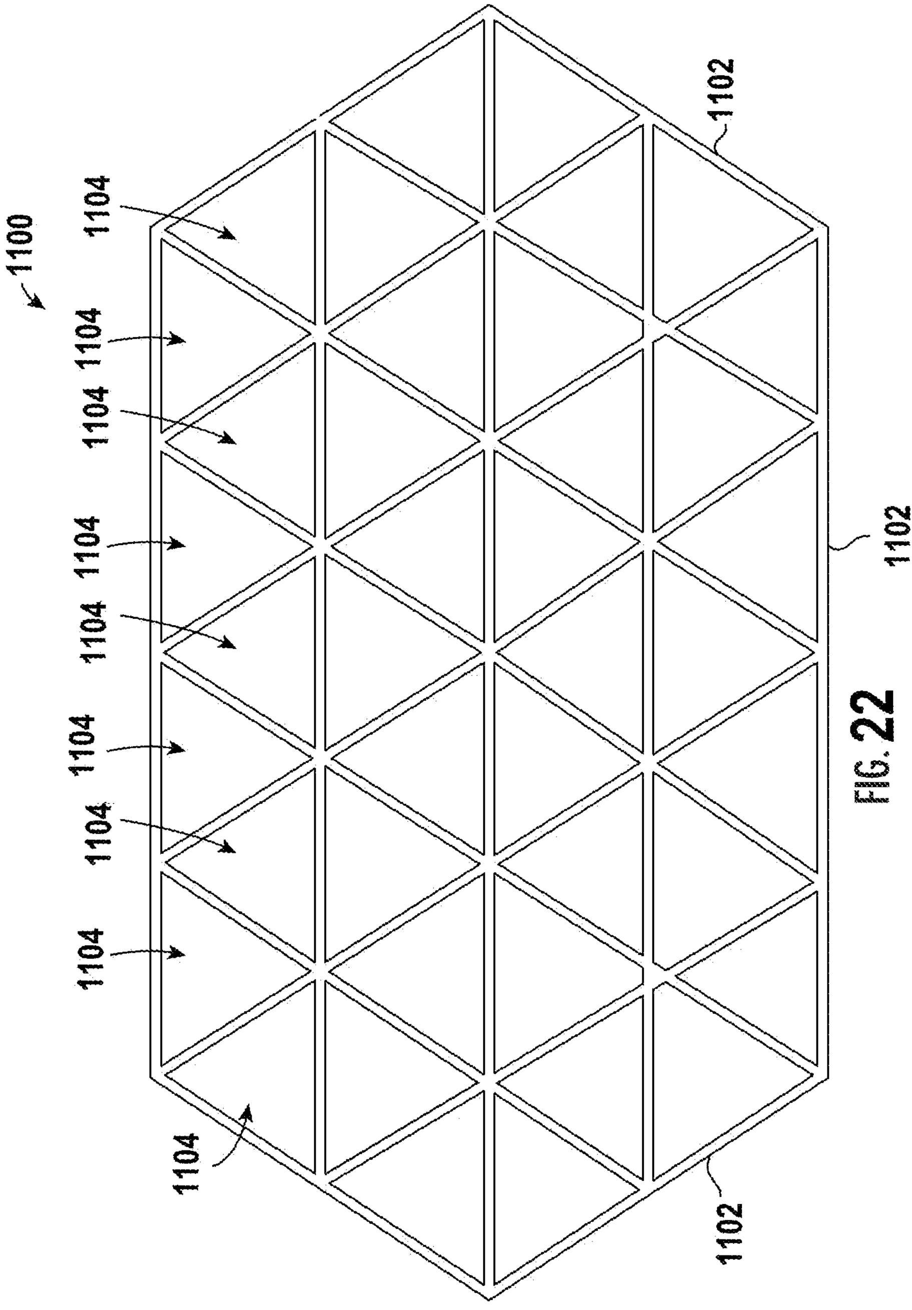
FIG. 22 shows a configuration of a screen for an air intake portion of a machine.
Figure 23:
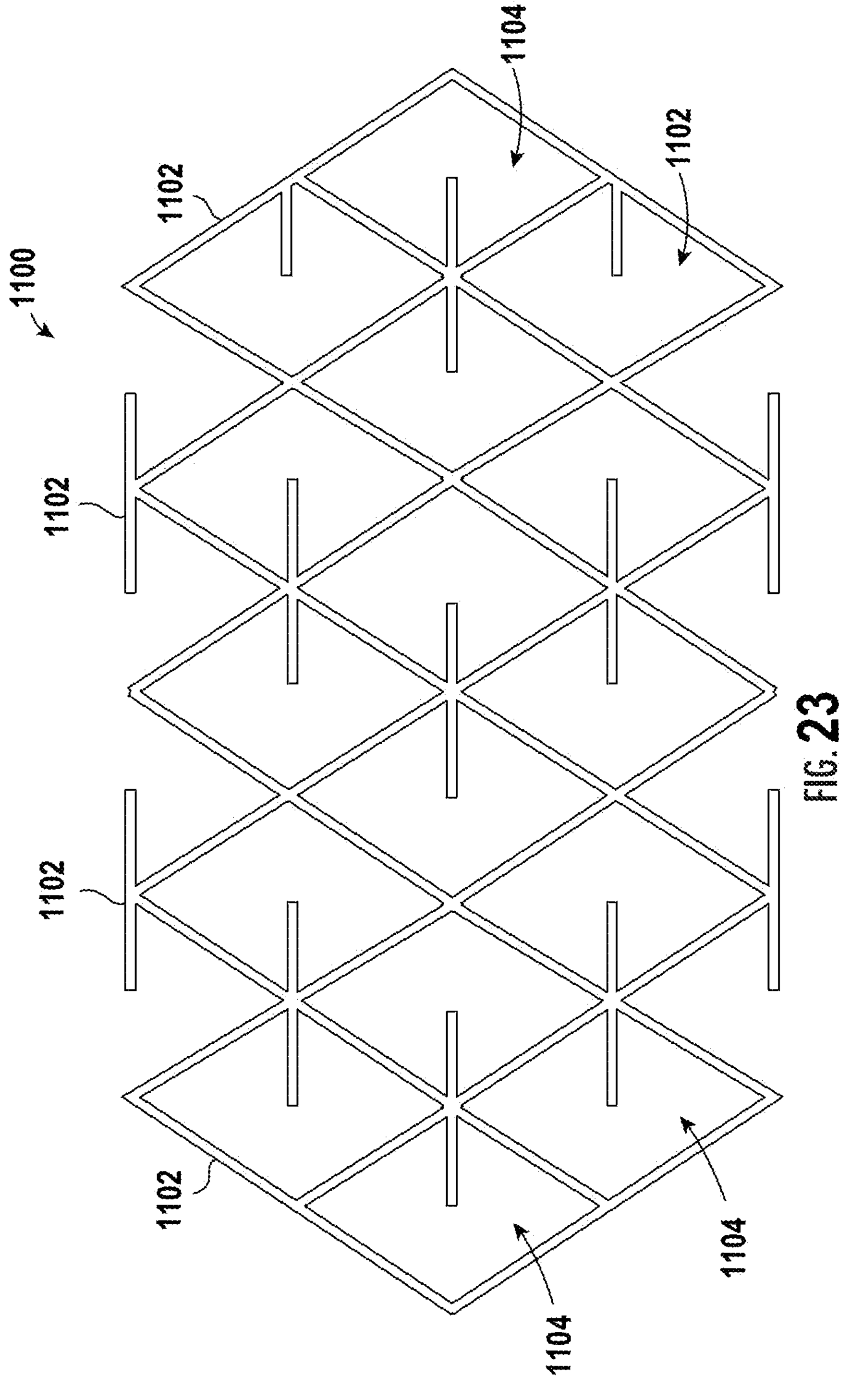
FIG. 23 shows a configuration of a screen for an air intake portion of a machine.
Figure 24:
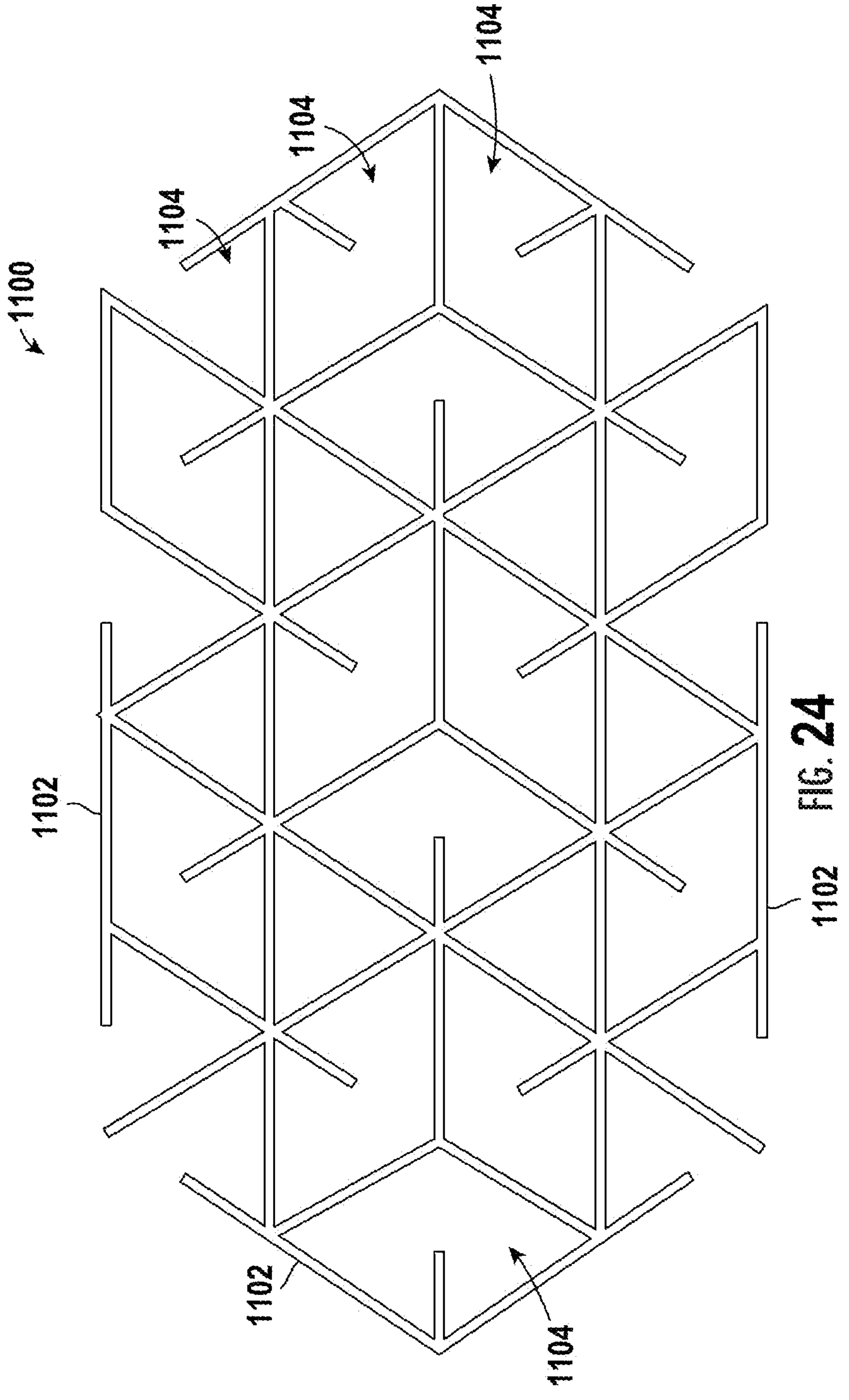
FIG. 24 shows a configuration of a screen for an air intake portion of a machine.

In exemplary embodiments, the screen 1100 includes an assembly of screen members 1102 that form a plurality of screen cells 1104, and at least a portion of the screen cells define an irregular configuration. As used herein, the term "irregular configuration" with respect to a screen cell refers to an irregular configuration of screen members, an irregular cavity formed by the screen members, and/or an irregular space defined or bounded by the screen members. As used herein, the term "irregular configuration" with respect to a screen cell may refer to an asymmetrical configuration as defined by the screen cell 1104 of FIG. 19. In some exemplary embodiments, a screen cell defining an irregular configuration includes more than four (4) members. For example, FIGS. 17 and 18 illustrate exemplary embodiments of the present disclosure where each screen cell 1104 includes six (6) members. FIG. 19 illustrates an exemplary embodiment of the present disclosure where a screen cell 1104 includes five (5) members. FIG. 21 illustrates an exemplary embodiment of the present disclosure where a plurality of screen cells 1104 include eight (8) members. FIGS. 23 and 24 illustrate exemplary embodiments of the present disclosure where a screen cell 1014 includes five (5) members.

In exemplary embodiments, the term "irregular configuration" is intended to mean a configuration or cavity shape that is none of a triangle, quadrilateral, pentagon, or hexagon (e.g., the non-square cavity shown in FIG. 18 or non-square cavity having four sides with a barrier screen member 1106 extending into a cavity 1108 shown in FIG. 19). In some exemplary embodiments, the irregular configuration or shape may be taken to mean at least one cantilevered member 106 that extends between members that form the outer periphery or outer walls of the cavity 1108.

Referring to FIGS. 16 and 17, in exemplary embodiments, the screen 1100 includes an assembly of screen members 1102 that form a plurality of screen cells 1104 and a barrier screen member or cantilevered member 1106 that extends into a cavity 1108 of each of the screen cells 1104. Furthermore, each of the screen cells 1104 having the portion of screen removed extend into a cavity 1108 of the screen cell 1104 and terminate at an open end 1110.

In one exemplary embodiment, the assembly of screen members 1102 includes a modified mesh geometry that forms the plurality of screen cells 1104. For example, each of the barrier screen members 1106 terminate at an open end 1110 and the open end 1110 of each of the barrier screen members 1106 do not touch any portion of the screen cells 1104. In this manner, a screen 1100 of the present disclosure eliminates portions of the screen members to reduce aerodynamic losses while maintaining the same foreign object protection. For example, referring to FIG. 20, a screen 1100 (FIGS. 16 and 17) of the present disclosure eliminates portions 1200 of screen members. In one exemplary embodiment, one screen member 1200 is eliminated in every screen cell 1104. In another exemplary embodiment, two screen members 1200 are eliminated in every screen cell 1104. In yet another exemplary embodiment, three screen members 1200 are eliminated in every screen cell 1104. Furthermore, a screen 1100 of the present disclosure also reduces the overall weight of the screen 1100.

Referring to FIGS. 16 and 17, in one exemplary embodiment, at least one of the barrier screen members 1106 or at least one of the screen cells 1104 having the portion of screen removed extend orthogonal to a portion of the screen cells 1104. Referring to FIG. 16, the barrier screen member 1106 or at least one of the screen cells 1104 having the portion of screen removed may extend orthogonally any distance within the cavity 1108 of the screen cell 1104. In this manner, the screen 1100 of the present disclosure is able to maintain the same level of foreign object damage (FOD) protection as conventional screens. For example, referring to FIG. 16, the screen 1100 of the present disclosure is able to block a foreign object 202 from passing through a screen cell 1104 of the screen 1100. The farther the barrier screen member 1106 extends within the cavity 1108 of the screen cell 1104, the smaller the foreign object 1202 that can be prevented from flowing through the screen 1100.

Referring to FIG. 19, in another exemplary embodiment, at least one of the barrier screen members 1106 or at least one of the screen cells 1104 having the portion of screen removed extend oblique to a portion of the screen cells 1104. Referring to FIG. 19, the barrier screen member 1106 or at least one of the screen cells 1104 having the portion of screen removed may extend obliquely any distance within the cavity 1108 of the screen cell 1104. In this manner, the screen 1100 of the present disclosure is able to maintain the same level of FOD protection as conventional screens. For example, the screen 1100 of the present disclosure is able to block a foreign object 1202 (FIG. 16) from passing through a screen cell 1104 of the screen 1100. The farther the barrier screen member 1106 extends within the cavity 1108 of the screen cell 1104, the smaller the foreign object 1202 that can be prevented from flowing through the screen 1100.

Referring to FIG. 17, in an exemplary embodiment, the plurality of screen cells 1104 includes a staggered and alternating arrangement of barrier screen members 1106 or at least one of the screen cells 1104 having the portion of screen removed. In some embodiments, it is contemplated that the modified mesh geometry of a screen 1100 of the present disclosure may include a staggered and alternating arrangement of barrier screen members 1106 or at least one of the screen cells 1104 having the portion of screen removed that extend orthogonal to a portion of some of the screen cells 1104 and barrier screen members 1106 or at least one of the screen cells 1104 having the portion of screen removed that extend oblique to a portion of some of the screen cells 1104.

Referring to FIG. 18, in another exemplary embodiment, each of the screen cells 1104 includes a second barrier screen member 1120 that extends into the cavity 1108 of the screen cell 1104 and terminates at a second open end 1122. The second open end 1122 of each of the second barrier screen members 1120 do not touch any portion of the screen cells 1104. Furthermore, each of the screen cells 1104 includes a first portion of screen removed and a second portion of screen removed.

Referring to FIGS. 16-19, in exemplary embodiments, the screen 1100 includes an assembly of screen members 1102 that form a plurality of screen cells 1104 in a rectangular configuration. Referring to FIGS. 21-24, in other exemplary embodiments, the screen 1100 includes an assembly of screen members 1102 that form a plurality of screen cells 1104 in a triangular, skewed, diamond, parallelogram, quadrilateral, or other configurations. Referring to FIGS. 16-19 and 21-24, a screen 1100 of the present disclosure includes an assembly of screen members 1102 that form a plurality of screen cells 1104 in an asymmetrical configuration. Referring to FIGS. 16-19 and 21-24, a screen 1100 of the present disclosure includes an assembly of screen members 1102 that form a plurality of screen cells 1104 with a continuous material.

In an exemplary embodiment, the screen 1100 may be formed of any material having a suitable stiffness to provide FOD protection. For example, it is contemplated that a screen 1100 of the present disclosure may be formed of metals, woods, plastics, carbon fibers, or other suitable materials, though it is contemplated that other materials may be used.

In one exemplary embodiment, a screen 1100 of the present disclosure may be formed using precision casting, advanced machining, or other traditional manufacturing machines or methods. In one exemplary embodiment, a screen 1100 of the present disclosure is formed using additive manufacturing machines or methods. As described in detail below, exemplary embodiments of the formation of a screen 1100 of the present disclosure can involve the use of additive manufacturing machines or methods. As used herein, the terms “additively manufactured” or “additive manufacturing techniques or processes” refer generally to manufacturing processes wherein successive layers of material(s) are provided on each other to “build-up,” layer-by-layer, a three-dimensional component. The successive layers generally fuse together to form a monolithic component which may have a variety of integral sub-components.

Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets and laserjets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

In addition to using a direct metal laser sintering (DMLS) or direct metal laser melting (DMLM) process where an energy source is used to selectively sinter or melt portions of a layer of powder, it should be appreciated that according to alternative embodiments, the additive manufacturing process may be a “binder jetting” process. In this regard, binder jetting involves successively depositing layers of additive powder in a similar manner as described above. However, instead of using an energy source to generate an energy beam to selectively melt or fuse the additive powders, binder jetting involves selectively depositing a liquid binding agent onto each layer of powder. The liquid binding agent may be, for example, a photo-curable polymer or another liquid bonding agent. Other suitable additive manufacturing methods and variants are intended to be within the scope of the present subject matter.

The additive manufacturing processes described herein may be used for forming the screen 1100 using any suitable material. For example, the material may be plastic, metal, concrete, ceramic, polymer, epoxy, photopolymer resin, or any other suitable material that may be in solid, liquid, powder, sheet material, wire, or any other suitable form. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, iron, iron alloys, stainless steel, and nickel or cobalt based superalloys (e.g., those available under the name Inconel® available from Special Metals Corporation). These materials are examples of materials suitable for use in the additive manufacturing processes described herein, and may be generally referred to as “additive materials.”

In addition, one skilled in the art will appreciate that a variety of materials and methods for bonding those materials may be used and are contemplated as within the scope of the present disclosure. As used herein, references to “fusing” may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

In addition, the additive manufacturing process disclosed herein allows a screen 1100 to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein may be constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example a three-dimensional computer model, of a screen 1100 of the present disclosure. Accordingly, a three-dimensional design model of the component may be defined prior to manufacturing. In this regard, a model or prototype of the component may be scanned to determine the three-dimensional information of the component. As another example, a screen 1100 of the present disclosure may be constructed using a suitable computer aided design (CAD) program to define the three-dimensional design model of the component.

The design model may include 3D numeric coordinates of the entire configuration of the screen 1100 including both external and internal surfaces of the component. For example, the design model may define the body, the surface, and/or internal passageways such as openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, the screen 1100 described herein may be fabricated using the additive process, or more specifically each layer is successively formed, e.g., by fusing or polymerizing a plastic using laser energy or heat or by sintering or melting metal powder. For example, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

In addition, utilizing an additive process, the surface finish and features of the screen 1100 may vary as needed or desired depending on the application. For example, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer which corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

After fabrication of the screen 1100 is complete, various post-processing procedures may be applied to the component. For example, post processing procedures may include removal of excess powder by, for example, blowing or vacuuming. Other post processing procedures may include a stress relief process. Additionally, thermal, mechanical, and/or chemical post processing procedures can be used to finish the part to achieve a desired strength, surface finish, and other component properties or features.

While the present disclosure is not limited to the use of additive manufacturing to form the screen 1100, generally, additive manufacturing does provide a variety of manufacturing advantages, including ease of manufacturing, reduced cost, greater accuracy, etc. Also, the additive manufacturing methods described above enable much more complex and intricate shapes and contours of the screen 1100 described herein to be formed with a very high level of precision. For example, such components may include thin additively manufactured layers, cross sectional features, and component contours. In addition, the additive manufacturing process enables the manufacture of a screen 1100 having different materials such that different portions of the component may exhibit different performance characteristics. The successive, additive nature of the manufacturing process enables the construction of these novel features. As a result, a screen 1100 of the present disclosure formed using the methods described herein may exhibit improved performance and reliability.

As noted above, reverse flow turboprop engines include a core section 16. An air intake (e.g., intake 54) of the reverse flow turboprop engine guides an air flow from the propeller into the engine core 16. The core section 16 can include an inlet screen that prevents large debris in the air from entering the core section 16, helping to prevent foreign object damage (FOD) to the core section 16. The inlet screen, however, may be unable to prevent smaller debris, such as ice particles, from entering the core section. Ice particles (e.g., ice crystals that are less than 200 micrometers) can form at high altitudes and can be ingested into the engine during a flight. While ice particles are described herein, the present disclosure can be utilized to prevent any type of solid particle (e.g., ice, dust, sand, or the like) that is sized such that the inlet screen is unable to prevent such solid particles from entering the core section.

The particles may be ingested through the air intake 54 with the air flow. Such particles can rebound off cold surfaces within the air intake 54 and can flow far into the engine inlet and enter the core section of the engine. When the particles are ice particles, the ice particles can accumulate and form into larger ice chunks. Thus, the particles can damage the components of the core section. The damaged components may cause the compressor to surge or to stall, thereby reducing air flow through the core section. The damaged components can also cause flameout in the combustor, causing thrust loss of the engine 10. The damaged components can also damage the blades in the compressor or the turbine section as the particles impact the blades. In some instances, the particles, especially ice particles, can cause engine power loss during a flight. Such issues are particularly difficult to avoid when the turbine engine is a turboprop engine due to the geometry of the air intake and the engine plenum of turboprop engines as compared to other types of turbine engines, such as, for example, turbofan engines that include annular inlets.

As described above, heated surfaces in the air intake can be used to prevent ice formation or to melt the ice particles. As described above, screen(s) can also be used to prevent particles from entering the engine 10. Alternatively or additionally, a particle deflector assembly can be provided that includes one or more particle deflector walls positioned within the engine plenum orhter chamber of the intake channel to deflect particles and preventing the particles from flowing into the core section. The particle deflector assembly is positioned below (e.g., radially outward and lower than) the engine inlet of the core section in an area where the airflow velocity is low and the particle inertia is high to allow for separation of the particles from the airflow. In certain embodiments, the particle deflector assembly is positioned at a plenum end wall of an engine plenum where the plenum end wall redirects the airflow from the air intake towards the core section. In some embodiments, the particle deflector assembly includes a metal sheet that is coupled to the plenum end wall below the core section and extends into the engine plenum. The particles impinge against the metal sheet such that the metal sheet prevents the particles from flowing to the core section through the engine inlet and from re-circulating inside the engine plenum. In this way, the particles are stopped and collected at the bottom of the engine plenum. The particle capture efficiency can be improved by using multiple metal sheets and by segmenting the particle deflector assembly. In some embodiments, the particle deflector assembly includes one or more heated surfaces to initiate melting and evaporating the particles to prevent the particles from re-circulating inside the engine plenum.

Thus, certain embodiments provide an improved and simplified particle deflector assembly that prevents the particles from entering the core section of the turbine engine without overly sacrificing aerodynamic performance of the air intake or the engine plenum, as compared to turbine engines without the benefit of the present disclosure.

Figure 25:
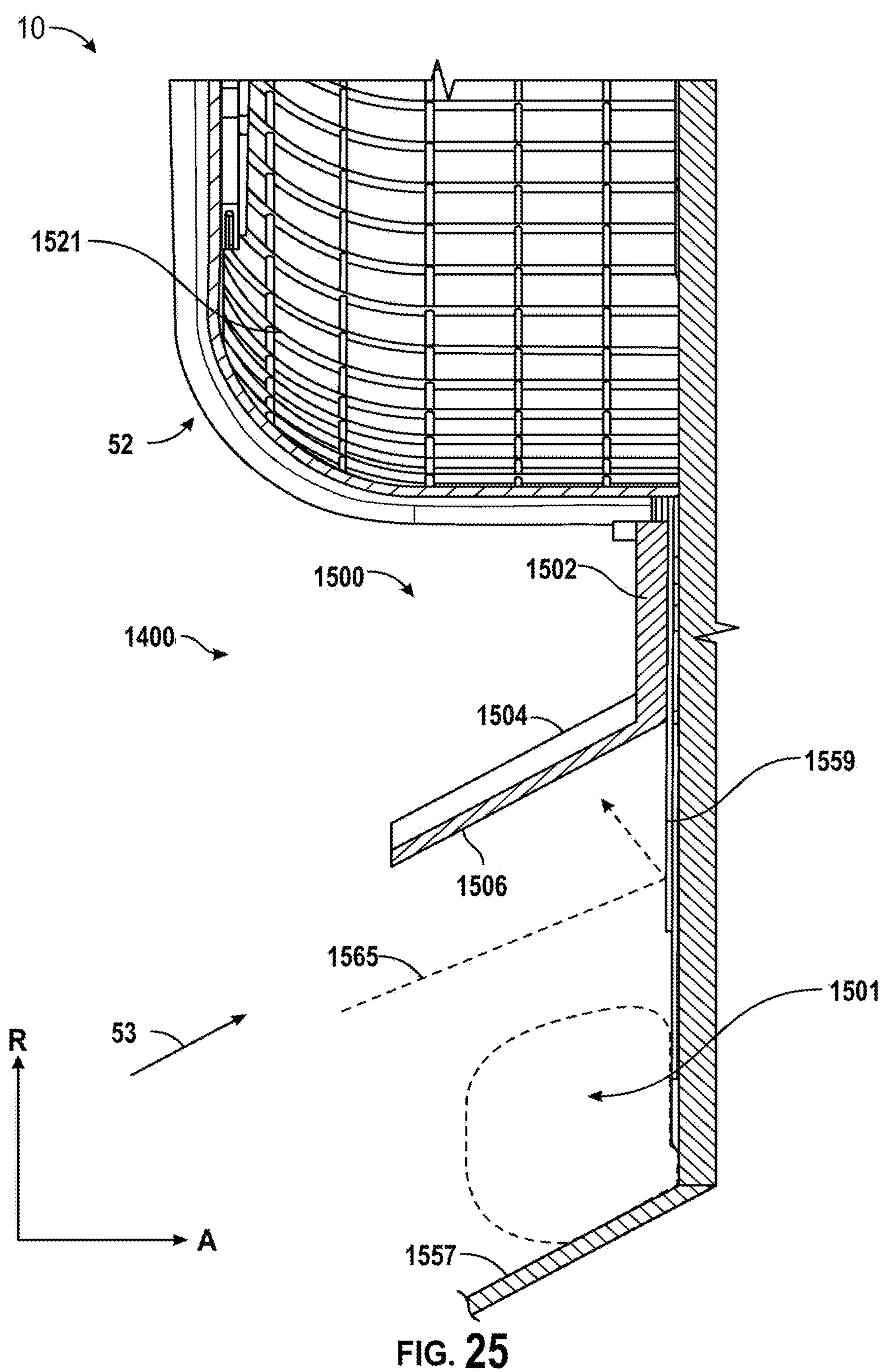
FIG. 25 is a schematic cross-sectional diagram of a portion of an engine plenum or other guiding structure of a turbine engine including a particle deflector assembly.

FIG. 25 is a schematic cross-sectional diagram of a portion of an engine plenum 1400 or other guiding structure or pressurized chamber in the intake channel 54 of the turbine engine 10 including a particle deflector assembly 1500, taken along the longitudinal centerline axis 12. As shown in FIG. 25, a mean (e.g., average) path of the core air 53 (as depicted by an arrow streamline in FIG. 25) is generally parallel with the radially angled duct wall 1557 prior to the plenum end wall 1559 redirecting the core air 53 towards the radial inlet 52. The mean path of the core air 53 may be angled with respect to the radially angled duct wall 1557 by plus or minus twenty degrees (±20°) due to the core air 53 being directed towards the radial inlet 52 within the engine plenum 1400. The particle deflector assembly 1500 causes a portion of the core air 53 to separate from the radially angled duct wall 1557 and generates a low momentum flow of the core air 53, also referred to as a recirculation zone 1501. The portion of the core air 53 that forms the recirculation zone 1501 generates a swirl, or a vortex, of the core air 53 to define the recirculation zone 1501. In this way, the recirculation zone 1501 includes the portion of the core air 53 that swirls, or recirculates, within the recirculation zone 1501. The velocity of the portion of the core air 53 in the recirculation zone 1501 is lower than the velocity of the core air 53 that is directed into the radial inlet 52 (e.g., the core air 53 that is outside of the recirculation zone 1501).

The particle deflector assembly 1500 deflects particles in the core air 53 and the recirculation zone 1501 decelerates the particles and prevents the particles from flowing towards and into the radial inlet 52, as detailed further below. In this way, the particle deflector assembly 1500 separates the particles from the core air 53 and captures the particles to prevent the particles from entering the turbo-engine 16 (e.g., through the radial inlet 52). In the embodiment of FIG. 25, the particle deflector assembly 1500 deflects the particles such that the particles spread circumferentially along the particle deflector assembly 1500. The particle deflector assembly 1500 also captures the particles within the recirculation zone 1501.

The particle deflector assembly 1500 is positioned radially between the radial inlet 52 and the radially angled duct wall 1557. In particular, the particle deflector assembly 1500 is positioned in an area of the engine plenum 1400 or other area of the intake channel 54 in which an inertia of the particles is high such that the particles do not follow the mean path of the core air 53. For example, the particle deflector assembly 1500 is positioned in an area of the engine plenum 1400 in which a mean path of the particles (as indicated by the dashed arrow 1565) diverges from the mean path of the core air 53 by at least ten degrees (10°). In particular, the particle deflector assembly 1500 is positioned radially inward (e.g., closer to the longitudinal centerline axis 12) and axially aft of the area at which the mean path of the particles diverges from the mean path of the core air 53. In this way, the particle deflector assembly 1500 captures the particles that separate from the core air 53 and flow towards the plenum end wall 1559. In some embodiments, the particle deflector assembly 1500 is positioned in an area of the engine plenum 1400 in which the mean path of the particles diverges from the mean path of the core air 53 in a range of ten degrees to forty-five degrees (10° to 45°).

The particle deflector assembly 1500 is disposed at the plenum end wall 1559 in an area of the engine plenum 1400 or part of the intake channel 54 where kinetic energy of the particles is greater than kinetic energy of the core air 53 such that the particles continue their path towards the plenum end wall 1559, while the engine plenum 1400 redirects the core air 53 towards the radial inlet 52. In this way, the particle deflector assembly 1500 is positioned in an area in which the particles have difficulty following the flow of the core air 53 that turns towards the radial inlet 52 as the core air 53 impinges on the plenum end wall 1559. Such a location of the particle deflector assembly 1500 provides for separating a majority (e.g., greater than 50%) of the particles from the core air 53 without overly sacrificing aerodynamic performance of the intake channel 54 (e.g., without overly decreasing air pressure of the core air 53 within the intake channel 54 or without introducing additional pressure losses within the intake channel 54).

The particle deflector assembly 1500 includes one or more deflector end walls 1502 and one or more particle deflector walls 1504 that are angled from the one or more deflector end walls 1502. The one or more deflector end walls 1502 extend generally radially along the radial direction R and are coupled to the plenum end wall 1559 such that the one or more deflector end walls 1502 form a part of the plenum end wall 1559. The one or more deflector end walls 1502 can be coupled to the plenum end wall 1559 by any coupled means, such as, for example, bolts, welding, or the like. In some embodiments, the one or more deflector end walls 1502 are formed with the plenum end wall 1559 such that the one or more deflector end walls 1502 and the plenum end wall 1559 form a single, unitary component.

The one or more particle deflector walls 1504 extend from the one or more deflector end walls 1502. The one or more particle deflector walls 1504 are angled at a core air deflector angle with respect to the mean path of the core air 53 in the engine plenum 1400. The core air deflector angle is measured from the mean path of the core air 53 to the one or more particle deflector walls 1504 (e.g., to one or more particle deflector surfaces 1506 of the one or more particle deflector walls 1504). For example, the core air deflector angle is greater than 0° and less than or equal to 60° such that the particles in the core air 53 impinge on the one or more particle deflector walls 1504, and the one or more particle deflector walls 1504 prevent the particles from entering the radial inlet 52. The one or more particle deflector walls 1504 extend axially forward from a bottom end of the one or more deflector end walls 1502 and extend into the engine plenum 1400 and/or other area of the intake channel 54. In some embodiments, the deflector angle of the one or more particle deflector walls 1504 is substantially equal to an angle of the radially angled duct wall 1557 with respect to the plenum end wall 1559.

In some embodiments, the one or more particle deflector walls 1504 are angled at a particle deflector angle with respect to the mean path of the particles (as indicated by the dashed arrow 1565) in the engine plenum 1400. The particle deflector angle is measured from the mean path of the particles to the one or more particle deflector walls 1504 (e.g., to the one or more particle deflector surfaces 1506 of the one or more particle deflector walls 1504). For example, the particle deflector angle is in a range of 30° to 90° such that the particles in the core air 53 impinge on the one or more particle deflector walls 1504, and the one or more particle deflector walls 1504 prevent the particles from entering the radial inlet 52.

The particle deflector assembly 1500 includes the one or more particle deflector surfaces 1506 that deflect the particles and prevents the particles from flowing towards the radial inlet 52. The one or more particle deflector surfaces 1506 are defined by a bottom surface of the one or more particle deflector walls 1504. In this way, the one or more particle deflector surfaces 1506 extend axially forward of the plenum end wall 1559 and extend into the engine plenum 1400 such that the particles impinge on the one or more particle deflector surfaces 1506, as detailed further below.

The particle deflector assembly 1500 has an axial deflector length that extends in the axial direction A, a radial deflector height that extends in the radial direction R, and a circumferential deflector width that extends in the circumferential direction C. The axial deflector length is defined as a length, measured along the axial direction A, from the plenum end wall 1559 to an axial forward end of the particle deflector assembly 1500 (e.g., of the one or more particle deflector walls 1504). The radial deflector height is defined as a height, measured along the radial direction R, from a bottom surface (e.g., the one or more particle deflector surfaces 1506) at the axial forward end of the particle deflector assembly 1500 (e.g., of the one or more particle deflector walls 1504) to a top surface at a radially top end of the particle deflector assembly 1500 (e.g., at the top surface of the one or more deflector end walls 1502). The circumferential deflector width is defined as a width, measured along the circumferential direction, from a circumferential forward surface of the particle deflector assembly 1500 to a circumferential aft surface of the particle deflector assembly 1500.

In the embodiment of FIG. 25, the circumferential deflector width of the particle deflector assembly 1500 is substantially equal to the circumferential plenum width of the engine plenum 1400. In this way, the particle deflector assembly 1500 extends substantially an entirety of the circumferential plenum width. In some embodiments, the circumferential deflector width is less than the circumferential plenum width such that the particle deflector assembly 1500 extends only partially along the circumferential plenum width of the engine plenum 1400. The axial deflector length is equal to or less than 70% of an axial length of the radial inlet 52. The radial deflector height is equal to or less than 60% of a radial height of the plenum end wall 59 from the radially angled duct wall 1557 at the plenum end wall 1559 to a radially inner surface of the radial inlet 52. Accordingly, the particle deflector assembly 1500 has a size (e.g., a surface area defined by the axial deflector length and the circumferential deflector width) that prevents a majority (e.g., at least 50%) of the particles in the core air 53 from entering the turbo-engine through the radial inlet 52. The values of the axial deflector length and the radial deflector height are exemplary only, and the values can be different based on a particular engine plenum configuration.

The particle deflector assembly 1500 is formed of one or more sheets, such as from metal, or the like. The particle deflector assembly 1500 can be made from any material that blocks particles in the core air 53 from entering the radial inlet 52. In some embodiments, the particle deflector assembly 1500 can be segmented such that the particle deflector assembly 1500 is made of a plurality of segments. In some embodiments, the particle deflector assembly 1500 includes a bleed flow opening defined by the one or more particle deflector walls 1504 that direct a portion of the core air 53 through the bleed flow opening and out of the particle deflector assembly 1500 such that the portion of the core air 53 flows towards the turbo-engine (e.g., towards the radial inlet 52). In some embodiments, the particle deflector assembly 1500 (e.g., the one or more particle deflector walls 1504) is heated such that the particle deflector assembly 1500 melts the particles that contact the particle deflector assembly 1500. For example, the particle deflector assembly 1500 can be heated by coils disposed within the particle deflector assembly 1500 (e.g., within the one or more particle deflector walls 1504). In some embodiments, hot compressor bleed air from the compressor 22 is directed towards the particle deflector assembly 1500 to heat the particle deflector assembly 1500. Heating the particle deflector assembly 1500 helps with capturing the particles within the particle deflector assembly 1500 (e.g., within the recirculation zone 1501).

In operation, the core air 53 flows through the engine plenum 1400, impinges on the plenum end wall 1559, and is directed into the radial inlet 52, as detailed above. The particles in the core air 53 separate from the core air 53 (e.g., the mean path of the particles diverges from the mean path of the core air 653) and impinge against the plenum end wall 1559 and flow in a direction of the radial inlet 52 (as indicated by the dashed arrow 1565). The particle deflector assembly 1500 prevents the particles from continuing to flow towards the radial inlet 52 and from entering the radial inlet 52. In particular, the particles impinge on the one or more particle deflector walls 1504 (e.g., the one or more particle deflector surfaces 1506) of the particle deflector assembly 1500. In this way, the particle deflector assembly 1500 captures the particles and prevents the particles from continuing to flow towards the radial inlet 52 and from entering the radial inlet 52, and, thus, from entering the turbo-engine core.

The particle deflector assembly 1500 decelerates the particles when the particles impinge on the one or more particle deflector walls 1504 such that the particles fall towards the recirculation zone 1501 and away from the radial inlet 52. A portion of the particles may decelerate upon impinging on the plenum end wall 1559 such that the portion of the particles fall towards the recirculation zone 1501 without contacting the particle deflector assembly 1500. The recirculation zone 1501 circulates the particles such that the recirculation zone 1501 prevents the particles from flowing back into the flow of the core air 53. In this way, the particle deflector assembly 1500 separates the particles from the core air 53 and captures the particles to prevent the particles from entering the radial inlet 52. The particle deflector assembly 1500 helps to capture the particles at a bottom of the engine plenum 1400 (e.g., on the radially angled duct wall 1557).

Figure 26A:
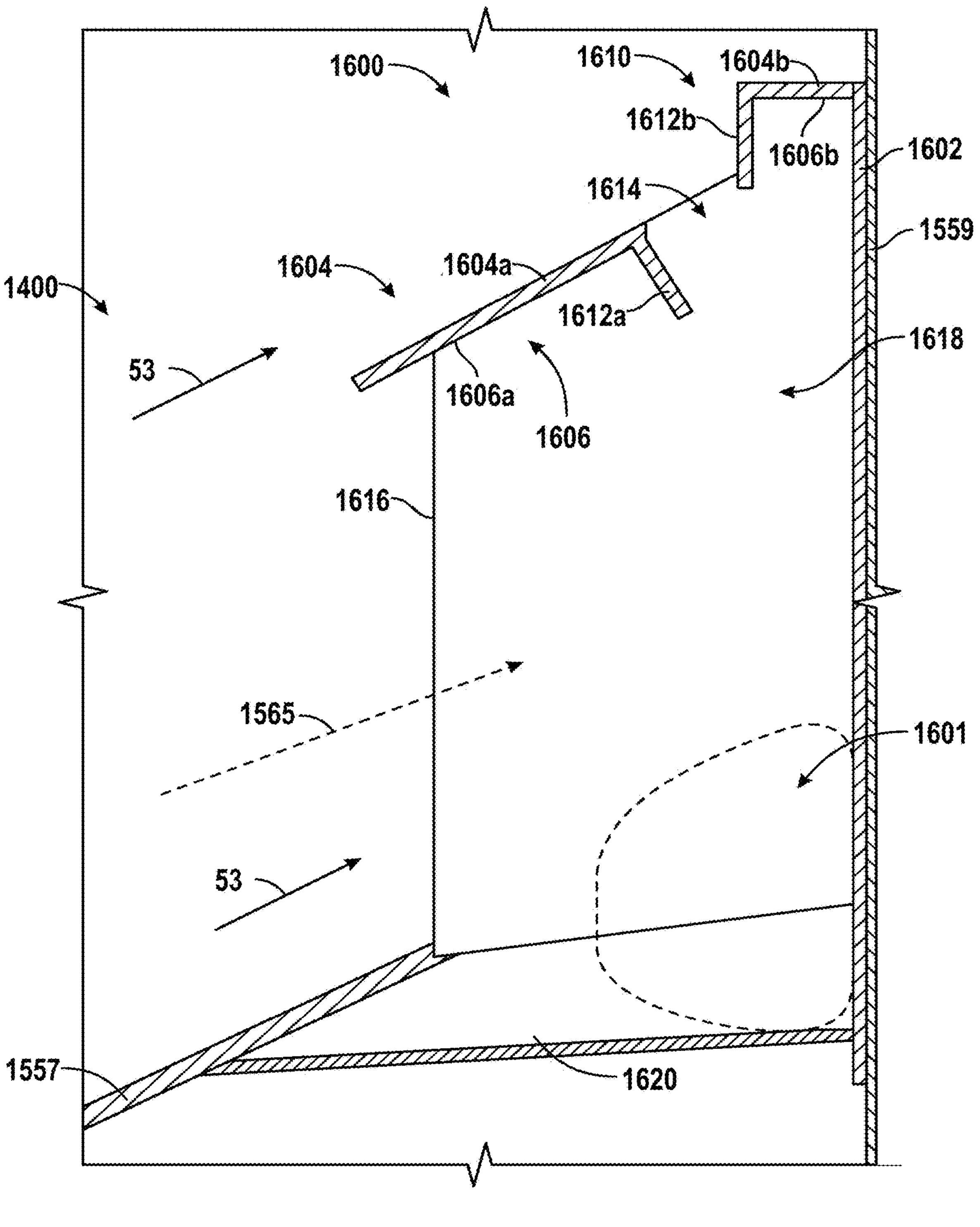
FIG. 26A is a schematic cross-sectional diagram of a particle deflector assembly for a turbine engine.
Figure 26B:
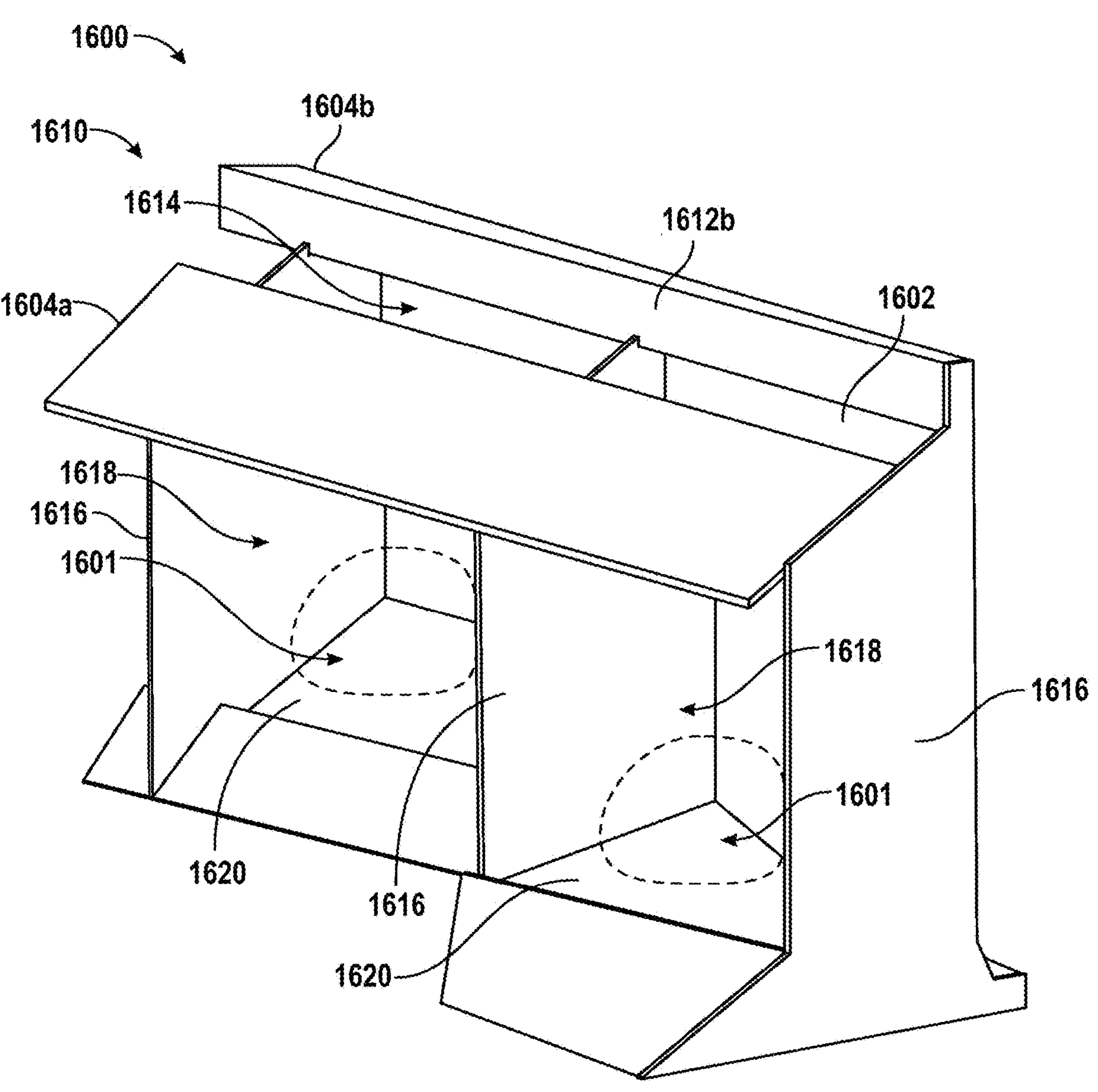
FIG. 26B shows a portion of the particle deflector assembly of FIG. 26A isolated from the turbine engine.

FIG. 26A is a schematic cross-sectional diagram of a particle deflector assembly 1600 for the turbine engine 10, taken along a longitudinal centerline axis of the particle deflector assembly 1600, according to another embodiment. FIG. 26B shows a portion of the particle deflector assembly 1600 isolated from the turbine engine 10, according to the present disclosure. The particle deflector assembly 1600 causes a portion of the core air 53 to separate from the radially angled duct wall 1557 and generates a low momentum flow of the core air 53, also referred to as a recirculation zone 1601. The particle deflector assembly 1600 is substantially similar to the particle deflector assembly 1500 of FIG. 25 and is positioned within the engine plenum 1400, similarly as does the particle deflector assembly 1500. The particle deflector assembly 1600 includes one or more deflector end walls 1602 and one or more particle deflector walls 1604. The particle deflector assembly 1600 includes an axial deflector length, a radial deflector height, and a circumferential deflector width. The axial deflector length is defined as a length, measured along the axial direction A, from the plenum end wall 1559 to an axial forward end of the particle deflector assembly 1600 (e.g., of the one or more particle deflector walls 1604). The radial deflector height is defined as a height, measured along the radial direction R, from a bottom surface (e.g., a bottom deflector wall 1620) at the axial forward end of the particle deflector assembly 1600 to a top surface at a radially top end of the particle deflector assembly 1600 (e.g., at the top surface of the one or more deflector end walls 1602). The circumferential deflector width is defined as a width, measured along the circumferential direction, from a circumferential forward surface of the particle deflector assembly 1600 to a circumferential aft surface of the particle deflector assembly 1600.

The one or more deflector end walls 1602 are coupled to, or are formed with, the plenum end wall 1559, such that the one or more deflector end walls 1602 form a part of the plenum end wall 1559. In this way, the particle deflector assembly 1600 is disposed at the plenum end wall 1559. The one or more particle deflector walls 1604 are positioned at a top end of the particle deflector assembly 1600. The one or more particle deflector walls 1604 include a first particle deflector wall 1604*a* and a second particle deflector wall 1604*b*. The first particle deflector wall 1604*a* is spaced axially forward from the one or more deflector end walls 1602. The first particle deflector wall 1604*a* is angled with respect to the mean path of the core air 53 at a core air deflector angle that is greater than 0° and less than or equal to 60°. In some embodiments, the first particle deflector wall 1604*a* is angled with respect to the mean path of the particles (as indicated by the dashed arrow 1565) at a particle deflector angle that is greater than 10°, and, is preferably in a range of 30° to 90°. The second particle deflector wall 1604*b* is positioned at a top end of the one or more deflector end walls 1602 and extends generally axially forward from the one or more deflector end walls 1602.

The particle deflector assembly 1600 includes one or more particle deflector surfaces 1606 on which the particles impinge such that the particle deflector assembly 1600 captures the particles and prevents the particles from flowing towards the radial inlet 52. The one or more particle deflector surfaces 1606 are defined by a bottom surface of the one or more particle deflector walls 1604 such that the particles impinge the bottom surface of the one or more particle deflector walls 1604. The one or more particle deflector surfaces 1606 include a first particle deflector surface 1606*a* and a second particle deflector surface 1606*b*. The first particle deflector surface 1606*a* is defined by a bottom surface of the first particle deflector wall 1604*a*. The second particle deflector surface 1606*b* is defined by a bottom surface of the second particle deflector wall 1604*b*.

The particle deflector assembly 1600 also includes a louver assembly 1610 and a plurality of vertical segment walls 1616. The louver assembly 1610 includes a first louver wall 1612*a* and a second louver wall 1612*b*. The first louver wall 1612*a* is defined by the first particle deflector wall 1604*a* at an axially aft end of the first particle deflector wall 1604*a* and extends generally towards the one or more deflector end walls 1602 (e.g., towards the plenum end wall 1559). The second louver wall 1612*b* is defined by the second particle deflector wall 1604*b* at an axially forward end of the second particle deflector wall 1604*b* and extends generally radially towards the radially angled duct wall 1557.

The first particle deflector wall 1604*a* is spaced axially forward from the second particle deflector wall 1604*b* such that the first louver wall 1612*a* is spaced axially forward from the second louver wall 1612*b*. In this way, the particle deflector assembly 1600 includes a bleed flow opening 1614 defined between the first particle deflector wall (e.g., the first louver wall 1612*a*) and the second particle deflector wall 1604*b* (e.g., the second louver wall 1612*b*). As shown in FIG. 26B, the bleed flow opening 1614 includes a single bleed flow opening 1614 that extends an entirety of the circumferential deflector width of the particle deflector assembly 1600. In some embodiments, the particle deflector assembly 1600 includes a plurality of bleed flow openings 1614 that is spaced along the circumferential deflector width of the particle deflector assembly 1600.

The particle deflector assembly 1600 also includes a bottom deflector wall 1620 that contacts the radially angled duct wall 1557 such that the bottom deflector wall 1620 forms a part of the radially angled duct wall 1557. In some embodiments, the bottom deflector wall 1620 is coupled to the radially angled duct wall 1557 or forms a single, unitary component with the radially angled duct wall 1557. The plurality of vertical segment walls 1616 extends from the bottom deflector wall 1620 to the top end of the particle deflector assembly 1600. The one or more deflector end walls 1602 and the one or more particle deflector walls 1604 are coupled to the plurality of vertical segment walls 1616. The plurality of vertical segment walls 1616 is spaced circumferentially along the circumferential deflector width such that the particle deflector assembly 1600 is segmented to define one or more deflector chambers 1618. Each of the one or more deflector chambers 1618 is defined between two of the plurality of vertical segment walls 1616. The one or more deflector chambers 1618 retain the particles that are captured by the particle deflector assembly 1600.

The particle deflector assembly 1600 operates substantially similarly as does the particle deflector assembly 1500 of FIG. 25. In particular, the core air 53 flows through the engine plenum 1400, impinges on the plenum end wall 1559, and is directed into the radial inlet 52, as detailed above. Particles in the core air 53 impinge against the plenum end wall 1559 and flow into the one or more deflector chambers 1618 (as indicated by the dashed arrow 1565). In this way, the particle deflector assembly 1600 captures the particles and prevents the particles from entering the radial inlet 52. In particular, the particles impinge on the plenum end wall 1559 (e.g., the one or more deflector end walls 1602) within the one or more deflector chambers 1618. A portion of the particles impinge on the one or more particle deflector walls 1604 (e.g., the one or more particle deflector surfaces 1606). For example, the portion of the particles can impinge on at least one of the first particle deflector wall 1604*a* (e.g., the first particle deflector surface 1606*a*) of the second particle deflector wall 1604*b* (e.g., the second particle deflector surface 1606*b*). In this way, the particle deflector assembly 1600 prevents the particles from continuing to flow towards the radial inlet 52 and from entering the turbo-engine through the radial inlet 52.

The particle deflector assembly 1600 decelerates the particles when the particles impinge on the plenum end wall 1559 (e.g., the one or more deflector end walls 1602) and on the one or more particle deflector walls 1604 such that the particles fall towards the recirculation zone 1601 and away from the radial inlet 52. The recirculation zone 1601 circulates the particles such that the recirculation zone 1601 prevents the particles from flowing back into the flow of the core air 53. In this way, the particle deflector assembly 1600 separates the particles from the core air 53 and captures the particles to prevent the particles from entering the radial inlet 52. The particle deflector assembly 1600 helps to collect the particles at a bottom of the engine plenum 1558 (e.g., on the radially angled duct wall 1557). The one or more deflector chambers 1618 facilitate collection of a greater number of particles than does the particle deflector assembly 1500 of FIG. 25 without the plurality of vertical segment walls.

The bleed flow opening 1614 directs a portion of the core air 53 from the one or more deflector chambers 1618 such that the portion of the core air 53 flows from the particle deflector assembly 1600 to the radial inlet 52. The bleed flow opening 1614 is sized to control an amount of the portion of the core air 53 that flows through the bleed flow opening 1614 and to control a size of the recirculation zone 1601. The size of the bleed flow opening 1614 is selected to allow the core air 53 to flow therethrough, while also preventing the particles from escaping the particle deflector assembly 1600.

Figure 27:
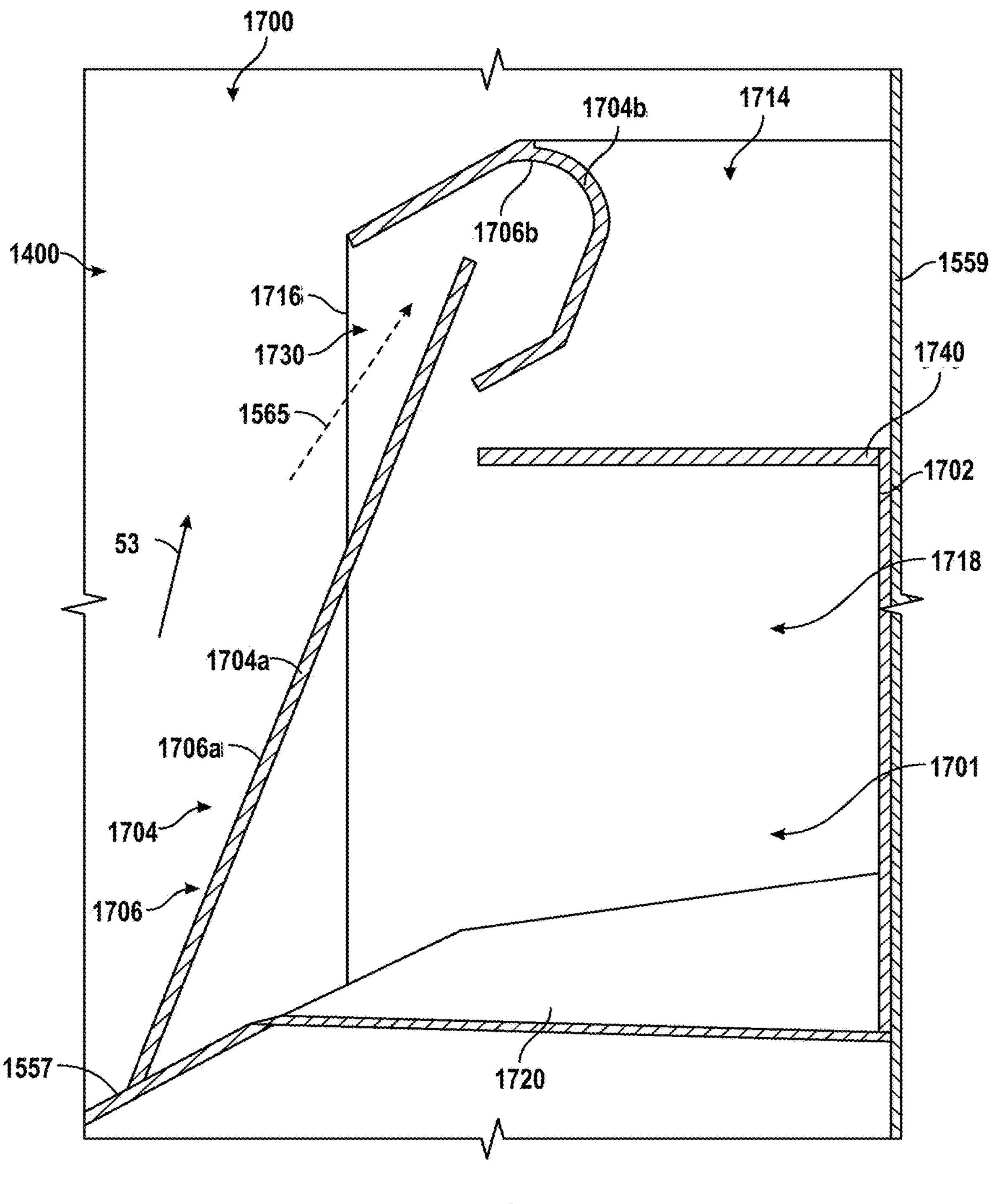
FIG. 27 is a schematic cross-sectional diagram of a particle deflector assembly for the turbine engine.

FIG. 27 is a schematic cross-sectional diagram of a particle deflector assembly 1700 for the turbine engine 10, taken along a longitudinal centerline axis of the particle deflector assembly 1700, according to another embodiment. The particle deflector assembly 1700 causes a portion of the core air 53 to separate from the radially angled duct wall 1557 and generates a low momentum flow of the core air 53, also referred to as a recirculation zone 1701. The recirculation zone 1701 is defined by one or more deflector chambers 1718, as detailed further below. The particle deflector assembly 1700 is substantially similar to the particle deflector assemblies 1500, 1600 of FIGS. 25 and 26A-B, respectively, and is positioned within the engine plenum 1400 similarly as the particle deflector assemblies 1500, 1600. The particle deflector assembly 1700 includes an axial deflector length, a radial deflector height, and a circumferential deflector width. The particle deflector assembly 1700 includes one or more deflector end walls 1702, one or more particle deflector walls 1704, a plurality of vertical segment walls 1716, the one or more deflector chambers 1718, and a bottom deflector wall 1720.

The one or more deflector end walls 1702 are coupled to, or are formed with, the plenum end wall 1559 such that the one or more deflector end walls 1702 form a part of the plenum end wall 1559. In this way, the particle deflector assembly 1700 is disposed at the plenum end wall 1559. The one or more particle deflector walls 1704 include a first particle deflector wall 1704*a* and a second particle deflector wall 1704*b*. The first particle deflector wall 1704*a* is positioned at a forward end of the particle deflector assembly 1700 and extends in the radial direction R and is angled axially aft towards the one or more deflector end walls 1702. The first particle deflector wall 1704*a* is angled with respect to the mean path of the core air 53 at a core air deflector angle that is greater than 0° and less than or equal to 60°. In some embodiments, the first particle deflector wall 1704*a* is angled with respect to the mean path of the particles (as indicated by the dashed arrow 65) at a particle deflector angle that is in a range of 30° to 90°.

The second particle deflector wall 1704*b* is positioned at a top end (e.g., a radially outward end closer to the radial inlet 52) of the particle deflector assembly 1700 and is spaced axially forward from the plenum end wall 1559. In this way, the particle deflector assembly 1700 includes a bleed flow opening 1714 defined between the plenum end wall 1559 and the second particle deflector wall 1704*b*. The second particle deflector wall 1704*b* is a curved wall that deflects the particles into the one or more deflector chambers 1718. For example, the second particle deflector wall 1704*b* is a generally U-shaped wall that prevents the particles from flowing towards the radial inlet 52 and directs the particles into the particle deflector assembly 1700 (e.g., into the one or more deflector chambers 1718). The second particle deflector wall 1704*b* is spaced radially from the first particle deflector wall 1704*a* such that a chamber opening 1730 is defined between the first particle deflector wall 1704*a* and the second particle deflector wall 1704*b*.

The particle deflector assembly 1700 includes a plurality of particle deflector surfaces 1706, including a first particle deflector surface 1706*a* and a second particle deflector surface 1706*b*. The first particle deflector surface 1706*a* is defined by a top surface of the first particle deflector wall 1704*a* and the second particle deflector surface 1706*b* is defined by a bottom surface of the second particle deflector wall 1704*b*. In this way, the particles impinge on the first particle deflector surface 1706*a* of the first particle deflector wall 1704*a* and on the second particle deflector surface 1706*b* of the second particle deflector wall 1704*b* such that the particle deflector assembly 1700 directs the particles into the one or more deflector chambers 1718 to capture the particles, as detailed further below.

The plurality of vertical segment walls 1716 extends from the bottom deflector wall 1720 to the top end of the particle deflector assembly 1700. The one or more deflector end walls 1702 and the one or more particle deflector walls 1704 are coupled to the plurality of vertical segment walls 1716. The plurality of vertical segment walls 1716 is spaced circumferentially along the circumferential deflector width such that the particle deflector assembly 1700 is segmented into a plurality of particle deflector segments. In this way, the particle deflector assembly 1700 includes one or more deflector chambers 1718. Each of the one or more deflector chambers 1718 is defined between two of the plurality of vertical segment walls 1716. The one or more deflector chambers 1718 retain the particles that the particle deflector assembly 1700 collects.

The particle deflector assembly 1700 includes one or more deflector chamber walls 1740 that are disposed within the one or more deflector chambers 1718. The one or more deflector chamber walls are spaced radially below the second particle deflector wall 1704*b* and extend generally axially forward, for example, from the one or more deflector end walls 1702. The one or more deflector end walls 1702 extend radially from the bottom deflector wall 1720 to the one or more deflector chamber walls 1740. In this way, the one or more deflector end walls 1702 extend only a portion of the radial height of the particle deflector assembly 1700, and the one or more deflector chamber walls 1740 are positioned at a top end of the one or more deflector end walls 1702. In some embodiments, the one or more deflector end walls 1702 extend an entirety, or substantially an entirety, of the radial deflector height of the particle deflector assembly 1700, and the one or more deflector chamber walls 1740 are positioned radially between the bottom deflector wall 1720 and the second particle deflector wall 1704*b*. Each of the one or more deflector chambers 1718 defines the recirculation zone 1701 such that the recirculation zone 1701 is defined between the bottom deflector wall 1720, the one or more deflector chamber walls 1740, the one or more deflector end walls 1702, and the first particle deflector wall 1704*a*.

The particle deflector assembly 1700 operates substantially similarly as do the particle deflector assemblies 1500, 1600 of FIGS. 25, 26A, and 26B. In particular, the core air 53 flows through the engine plenum 1400, impinges on the plenum end wall 1559, and is directed into the radial inlet 52, as detailed above. The particle deflector assembly 1700 prevents the particles from entering the radial inlet 52. The particles in the core air 53 flow towards the particle deflector assembly 1700 (as indicated by the dashed arrow 1565) and impinge against the one or more particle deflector walls 1704 (e.g., against the one or more particle deflector surfaces 1706). In particular, the particles impinge on the first particle deflector wall 1704*a* (e.g., the first particle deflector surface 1706*a*) and the first particle deflector wall 1704*a* directs the particles radially and axially towards the second particle deflector wall 1704*b* (e.g., the second particle deflector surface 1706*b*).

The particles impinge on the second particle deflector wall 1704*b* (e.g., the second particle deflector surface 1706*b*) and the second particle deflector wall 1704*b* directs the particles into the one or more deflector chambers 1718. The second particle deflector wall 1704*b* is shaped to direct the particles between the first particle deflector wall 1704*a* and the one or more deflector chamber walls 1740 within the one or more deflector chambers 1718. In this way, the particle deflector assembly 1700 directs the particles below the one or more deflector chamber walls 1740 such that the one or more deflector chamber walls 1740 prevent the particles from flowing towards the radial inlet 52 from the particle deflector assembly 1700. In this way, the particle deflector assembly 1700 captures the particles therein.

A portion of the core air 53 also flows into the particle deflector assembly 1700 and into the one or more deflector chambers 1718. The bleed flow opening 1714 directs the portion of the core air 53 from the one or more deflector chambers 1718 such that the portion of the core air 53 flows from the particle deflector assembly 1700 to the radial inlet 52.

Accordingly, the present disclosure provides for an improved and a simplified particle deflector assembly that prevents the particles from entering the turbo-engine without structural changes to the air intake, the intake duct, or the engine plenum. The particle deflector assemblies of the present disclosure prevent the particles from entering the turbo-engine without overly sacrificing aerodynamic performance of the air intake or the engine plenum as compared to turbine engines without the benefit of the present disclosure. The recirculation zone decelerates the particles such that the particle deflector assembly prevents the particles from flowing into the turbo-engine through the radial inlet.

Further aspects are provided by the subject matter of the following clauses:

An aircraft engine assembly comprising: a gas turbine engine having a high pressure compressor, a high pressure turbine, a high pressure shaft coupling the high pressure compressor with the high pressure turbine, a low pressure turbine, and a low pressure shaft coupled to the low pressure turbine, the high pressure turbine located forward of the high pressure compressor, and the low pressure turbine located on a forward end of the gas turbine engine; an intake channel of the gas turbine engine configured to receive an incoming flow of air and form an intake flow of air, the intake channel configured to turn the received incoming flow of air from an incoming flow direction to a first axial direction of the gas turbine engine, the incoming flow direction reverse of the first axial direction; and an electric machine coupled with the low pressure shaft and located at the aft end of the gas turbine engine proximate the intake channel, the electric machine in heat exchange communication with the intake flow of air such that the electric machine transfers heat to the incoming flow of air within the intake channel when the electric machine is operated.

The aircraft engine assembly of one or more of these clauses, which further includes a tail cone, and wherein the electric machine is located within the tail cone.

The aircraft engine assembly of one or more of these clauses, wherein the low pressure shaft is oriented to extend through the intake channel such that an axial portion of the low pressure shaft is surrounded by the incoming flow of air in the intake channel.

The aircraft engine assembly of one or more of these clauses, wherein the electric machine is positioned to receive an impingement of the intake flow of air.

The aircraft engine assembly of one or more of these clauses, wherein an offtake flow of air is extracted from the intake flow of air, the offtake flow of air forming a cooling flow of air routed to the electric machine.

The aircraft engine assembly of one or more of these clauses, wherein the low pressure turbine includes variable stator vanes, wherein the gas turbine engine includes an engine controller, and wherein the variable stator vanes of the low pressure turbine are controlled by the controller to change position when the electric machine changes from a first power level to a second power level.

The aircraft engine assembly of one or more of these clauses, which further includes a propeller located on a forward end of the gas turbine engine and coupled via the low pressure shaft with the low pressure turbine, and which further includes a gearbox coupled between the low pressure shaft and the propeller.

The aircraft engine assembly of one or more of these clauses, which further includes a propeller located on a forward end of the gas turbine engine and coupled via the low pressure shaft with the low pressure turbine, and wherein the propeller is variable pitch propeller, and wherein the electric machine is coaxial with the low pressure shaft.

The aircraft engine assembly of one or more of these clauses, which further includes an engine nacelle enclosing the gas turbine engine, the electric machine located in an enclosed space aft of the high pressure compressor.

The aircraft engine assembly of one or more of these clauses, wherein the engine nacelle includes a discharge opening sized to permit discharge of the portion of the intake flow of air.

The aircraft engine assembly of one or more of these clauses, wherein the electric machine is in a conductive heat exchange communication with the intake flow of air.

The aircraft engine assembly of one or more of these clauses, which further includes an engine nacelle enclosing the gas turbine engine, the electric machine located in an enclosed space aft of the high pressure compressor.

The aircraft engine assembly of one or more of these clauses, wherein the engine nacelle includes a discharge opening sized to permit discharge of the portion of the intake flow of air.

The aircraft engine assembly of one or more of these clauses, wherein the electric machine is in a conductive heat exchange communication with the intake flow of air.

The aircraft engine assembly of one or more of these clauses, wherein the intake channel includes a first portion that directs air into a first radial side of the low pressure shaft, wherein the intake channel includes a second portion configured as annular in shape, and wherein the first portion is upstream of the second portion, the second portion directing the intake flow of air in the first axial flow direction toward the high pressure compressor.

An aircraft powerplant comprising: a gas turbine engine having a high pressure compressor and a high pressure turbine, the gas turbine engine further having a high pressure shaft coupling the high pressure compressor with the high pressure turbine, the gas turbine engine also having a first axial flow direction from the high pressure compressor to the high pressure turbine; a propeller coupled to a low pressure turbine of the gas turbine engine using a low pressure shaft, the low pressure shaft located coaxial with the high pressure shaft, the propeller configured to receive a free stream flow of air oriented in a freestream direction and impart work upon the free stream flow of air, the propeller located on an upstream side of the freestream direction from the high pressure turbine; an intake channel defining an intake flow of air in fluid communication with the gas turbine engine, the intake channel configured to reverse the intake flow of air initially flowing in the freestream direction to the first axial flow direction of the gas turbine engine; and an electric machine coupled to the low pressure shaft and located on an opposite side of the gas turbine engine from the propeller, the electric machine positioned to be cooled by a portion of the intake flow of air defined by the intake channel.

The aircraft powerplant of one or more of these clauses, which further includes an engine nacelle enclosing the gas turbine engine, the electric machine located in an enclosed space aft of the high pressure compressor.

The aircraft powerplant of one or more of these clauses, wherein the engine nacelle includes a discharge opening sized to permit discharge of the portion of the intake flow of air.

The aircraft powerplant of one or more of these clauses, wherein the electric machine is in a conductive heat exchange communication with the intake flow of air.

The aircraft powerplant of one or more of these clauses, wherein the intake channel includes a first portion that directs air into a first radial side of the low pressure shaft, wherein the intake channel includes a second portion configured as annular in shape, and wherein the first portion is upstream of the second portion, the second portion directing air in the first axial flow direction toward the high pressure compressor.

The aircraft powerplant of one or more of these clauses, wherein the gas turbine engine includes an engine controller, and wherein the engine controller commands a change in fuel flow rate to a combustion section of the gas turbine engine when the electric machine changes from a first power level to a second power level.

The aircraft powerplant of one or more of these clauses, wherein the low pressure turbine is a free turbine.

The aircraft powerplant of one or more of these clauses, an engine exhaust configured to receive an exhaust flow in the first axial flow direction from the low pressure turbine and discharge the exhaust flow having a second axial direction component reverse of the first axial direction.

A method of cooling an electric machine comprising: operating a gas turbine engine having a high pressure compressor, a high pressure turbine, and a high pressure shaft, the high pressure compressor coupled to the high pressure turbine via the high pressure shaft, the gas turbine engine also including a low pressure turbine coupled via a low pressure shaft with a propeller; receiving an incoming flow of air in an incoming flow of air direction into an intake channel of the gas turbine engine, the incoming flow of air used in a combustion process of the gas turbine engine, the intake channel forming an intake channel flow path and defining an intake flow air; turning the intake flow of air using the intake channel from the incoming flow of air direction to an axial flow direction of the gas turbine engine; and cooling an electric machine located aft of the low pressure turbine using the intake flow of air flowing through the intake channel flow path.

The method of cooling an electric machine of one or more of these clauses, wherein the cooling includes impingement cooling the electric machine using the intake flow of air.

The method of cooling an electric machine of one or more of these clauses, wherein turning the flow includes changing shape of the flow from a non-annular shape to an annular shape.

The method of cooling an electric machine of one or more of these clauses, wherein the electric machine is located in a tail cone located aft of the gas turbine engine.

An aircraft engine assembly including: a gas turbine engine having a high pressure compressor, a high pressure turbine, a high pressure shaft coupling the high pressure compressor with the high pressure turbine, a low pressure turbine, and a low pressure shaft coupled to the low pressure turbine, the high pressure turbine located forward of the high pressure compressor, and the low pressure turbine located on a forward end of the gas turbine engine; a propeller located on a forward end of the gas turbine engine and coupled via the low pressure shaft with the low pressure turbine; an intake channel of the gas turbine engine configured to receive an incoming flow of air and form an intake flow of air, the intake channel configured to turn the received incoming flow of air from an incoming flow direction to a first axial direction of the gas turbine engine, the incoming flow direction reverse of the first axial direction; and an electric machine coupled with the low pressure shaft and located on a side of the high pressure compressor opposite of the high pressure turbine and proximate the intake channel, the electric machine in heat exchange communication with the intake flow of air such that the electric machine transfers heat to the incoming flow of air within the intake channel when the electric machine is operated, wherein the high pressure compressor includes a flow path, the flow path defined between an inner flow surface and an outer flow surface, the flow path structured to convey the incoming flow of air to the compressor, and further including an anti-ice flow passage from the intake channel directing a flow of anti-ice air to the high pressure compressor.

The aircraft engine assembly of any of these clauses, wherein the anti-ice flow passage is formed with an inlet guide vane disposed in the flow path upstream of the high pressure compressor, the inlet guide vane extending from a root region to a tip region across the flow path, the root region and the tip region located in the flow path, the inlet guide vane having an internal cavity and the anti-ice flow passage located at the tip region between the internal cavity and an outer surface of the inlet guide vane, the anti-ice flow passage having a flow port structured to eject a flow of the anti-ice air, the anti-ice flow passage oriented in a direction having a radial component such that the anti-ice air is flowed in a substantially radial direction through the internal cavity over an entirety of the tip region exposed in the flow path.

The aircraft engine assembly of any of these clauses, wherein the inlet guide vane is pivotable from a first angular flow position to a second angular flow position.

The aircraft engine assembly of any of these clauses, including a plurality of inlet guide vanes having respective anti-ice flow passages.

The aircraft engine assembly of any of these clauses, wherein the inner flow surface is defined by a component having a shaft side passage, the anti-ice flow passage located proximate the shaft side passage and oriented to convey the anti-ice air onward to the shaft side passage of the component of the inner flow surface and to a region radially inward of the inner flow surface.

The aircraft engine assembly of any of these clauses, wherein the shaft side passage is oriented in a direction that includes an axial component, the axial component directed in an upstream direction, the shaft side passage delivering the anti-ice air to an upstream location of the inner flow surface.

The aircraft engine assembly of any of these clauses, wherein the inner flow surface includes an outlet port located upstream from the shaft side passage in the flow path.

An example aircraft engine assembly includes: a gas turbine engine having a high pressure compressor, a high pressure turbine, a high pressure shaft coupling the high pressure compressor with the high pressure turbine, a low pressure turbine, and a low pressure shaft coupled to the low pressure turbine, the high pressure turbine located forward of the high pressure compressor, and the low pressure turbine located on a forward end of the gas turbine engine; a propeller located on a forward end of the gas turbine engine and coupled via the low pressure shaft with the low pressure turbine; an intake channel of the gas turbine engine configured to receive an incoming flow of air and form an intake flow of air, the intake channel configured to turn the received incoming flow of air from an incoming flow direction to a first axial direction of the gas turbine engine, the incoming flow direction reverse of the first axial direction; an electric machine coupled with the low pressure shaft and located on a side of the high pressure compressor opposite of the high pressure turbine and proximate the intake channel, the electric machine in heat exchange communication with the intake flow of air such that the electric machine transfers heat to the incoming flow of air within the intake channel when the electric machine is operated; and a screen for the intake channel, the screen including an assembly of screen members that form a plurality of screen cells, wherein at least a portion of the screen cells define an irregular configuration.

The aircraft engine assembly of any of these clauses, wherein the screen includes a barrier screen member that extends into a cavity of at least one of the screen cells.

The aircraft engine assembly of any of these clauses, wherein the barrier screen member terminates at an open end, and wherein the open end does not touch any portion of the screen cells.

The aircraft engine assembly of any of these clauses, wherein the barrier screen member extends orthogonal to a portion of the screen cells.

The aircraft engine assembly of any of these clauses, wherein the barrier screen member extends oblique to a portion of the screen cells.

The aircraft engine assembly of any of these clauses, wherein the plurality of screen cells includes a staggered and alternating arrangement of a plurality of barrier screen members.

The aircraft engine assembly of any of these clauses, wherein each of the screen cells define the irregular configuration.

The aircraft engine assembly of any of these clauses, wherein the screen includes a modified mesh geometry of screen members that form a plurality of screen cells; and a barrier screen member that extends into a cavity of each of the screen cells.

An example aircraft engine assembly includes: a gas turbine engine having a high pressure compressor, a high pressure turbine, a high pressure shaft coupling the high pressure compressor with the high pressure turbine, a low pressure turbine, and a low pressure shaft coupled to the low pressure turbine, the high pressure turbine located forward of the high pressure compressor, and the low pressure turbine located on a forward end of the gas turbine engine; a propeller located on a forward end of the gas turbine engine and coupled via the low pressure shaft with the low pressure turbine; an intake channel of the gas turbine engine configured to receive an incoming flow of air and form an intake flow of air, the intake channel configured to turn the received incoming flow of air from an incoming flow direction to a first axial direction of the gas turbine engine, the incoming flow direction reverse of the first axial direction; an electric machine coupled with the low pressure shaft and located on a side of the high pressure compressor opposite of the high pressure turbine and proximate the intake channel, the electric machine in heat exchange communication with the intake flow of air such that the electric machine transfers heat to the incoming flow of air within the intake channel when the electric machine is operated; and a particle deflector assembly disposed in the intake channel, the particle deflector assembly including one or more particle deflector walls that extend into the intake channel and capture particles within the incoming flow of air.

The aircraft engine assembly of any of these clauses, wherein the one or more particle deflector walls of the particle deflector assembly define a recirculation zone such that the one or more particle deflector walls cause a portion of the incoming flow of air to generate a swirl of the portion of the incoming flow of air within the recirculation zone, and the recirculation zone decelerates the particles.

The aircraft engine assembly of any of these clauses, wherein the one or more particle deflector walls include one or more particle deflector surfaces, at least one of the one or more particle deflector surfaces is defined by a bottom surface of the one or more particle deflector walls, and the particles impinge on the one or more particle deflector surfaces.

The aircraft engine assembly of any of these clauses, wherein the particle deflector assembly defines a bleed flow opening defined by the one or more particle deflector walls, the bleed flow opening directing a portion of the incoming flow of air entering the bleed flow opening to flow out of the particle deflector assembly.

The aircraft engine assembly of any of these clauses, wherein the particle deflector assembly is positioned radially inward and axially aft of an area of the gas turbine engine in which a mean path of the particles diverges from a mean path of the incoming flow of air in a range of 10° to 45°.

The aircraft engine assembly of any of these clauses, wherein the one or more particle deflector walls include at least one particle deflector wall that is disposed at a particle deflector angle with respect to a mean path of the particles, the particle deflector angle being in a range of 30° to 90°.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

We claim:

1. An aircraft engine assembly comprising:

a gas turbine engine having a high pressure compressor, a high pressure turbine, a high pressure shaft coupling the high pressure compressor with the high pressure turbine, a low pressure turbine, and a low pressure shaft coupled to the low pressure turbine, the high pressure turbine located forward of the high pressure compressor, and the low pressure turbine located on a forward end of the gas turbine engine;

a propeller located on a forward end of the gas turbine engine and coupled via the low pressure shaft with the low pressure turbine;

an intake channel of the gas turbine engine configured to receive an incoming flow of air and form an intake flow of air, the intake channel configured to turn the received incoming flow of air from an incoming flow direction to a first axial direction of the gas turbine engine, the incoming flow direction reverse of the first axial direction; and an electric machine coupled with the low pressure shaft and located on a side of the high pressure compressor opposite of the high pressure turbine and proximate the intake channel, the electric machine in heat exchange communication with the intake flow of air such that the electric machine transfers heat to the incoming flow of air within the intake channel when the electric machine is operated, wherein the high pressure compressor includes a flow path, the flow path defined between an inner flow surface and an outer flow surface, the flow path structured to convey the incoming flow of air to the compressor, and further including an anti-ice flow passage from the intake channel directing a flow of anti-ice air to the high pressure compressor.

2. The aircraft engine assembly of claim 1, wherein the anti-ice flow passage is formed with an inlet guide vane disposed in the flow path upstream of the high pressure compressor, the inlet guide vane extending from a root region to a tip region across the flow path, the root region and the tip region located in the flow path, the inlet guide vane having an internal cavity and the anti-ice flow passage located at the tip region between the internal cavity and an outer surface of the inlet guide vane, the anti-ice flow passage having a flow port structured to eject a flow of the anti-ice air, the anti-ice flow passage oriented in a direction having a radial component such that the anti-ice air is flowed in a substantially radial direction through the internal cavity over an entirety of the tip region exposed in the flow path.

3. The aircraft engine assembly of claim 2, wherein the inlet guide vane is pivotable from a first angular flow position to a second angular flow position.

4. The aircraft engine assembly of claim 2, including a plurality of inlet guide vanes having respective anti-ice flow passages.

5. The aircraft engine assembly of claim 1, wherein the inner flow surface is defined by a component having a shaft side passage, the anti-ice flow passage located proximate the shaft side passage and oriented to convey the anti-ice air onward to the shaft side passage of the component of the inner flow surface and to a region radially inward of the inner flow surface.

6. The aircraft engine assembly of claim 5, wherein the shaft side passage is oriented in a direction that includes an axial component, the axial component directed in an upstream direction, the shaft side passage delivering the anti-ice air to an upstream location of the inner flow surface.

7. The aircraft engine assembly of claim 5, wherein the inner flow surface includes an outlet port located upstream from the shaft side passage in the flow path.

* * * * *